United States Patent
Fujii et al.

(10) Patent No.: US 10,625,569 B2
(45) Date of Patent: Apr. 21, 2020

(54) ENGINE CONTROLLER, AIR CONDITIONING SYSTEM, AND PROGRAM FOR AIR-CONDITIONING CONTROLLER

(71) Applicant: DENSO CORPORATION, Kariya, Aichi-pref. (JP)

(72) Inventors: Kouji Fujii, Kariya (JP); Hiroshi Nakajima, Kariya (JP); Takafumi Masuda, Kariya (JP); Masanori Morikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 214 days.

(21) Appl. No.: 15/759,237

(22) PCT Filed: Aug. 11, 2016

(86) PCT No.: PCT/JP2016/073693
§ 371 (c)(1),
(2) Date: Mar. 12, 2018

(87) PCT Pub. No.: WO2017/047302
PCT Pub. Date: Mar. 23, 2017

(65) Prior Publication Data
US 2018/0251009 A1 Sep. 6, 2018

(30) Foreign Application Priority Data
Sep. 15, 2015 (JP) ................. 2015-182169

(51) Int. Cl.
*B60H 1/04* (2006.01)
*F02D 29/02* (2006.01)
(Continued)

(52) U.S. Cl.
CPC ..... *B60H 1/00828* (2013.01); *B60H 1/00735* (2013.01); *B60H 1/00885* (2013.01);
(Continued)

(58) Field of Classification Search
CPC ........ B60H 1/04; B60H 1/06; B60H 1/00828; B60H 1/00735; B60H 1/00885; F03D 29/02; F03D 41/021; F02N 11/084
(Continued)

(56) References Cited

U.S. PATENT DOCUMENTS 5,699,960 A 12/1997 Kato et al.
5,996,365 A 12/1999 Tanaka
(Continued)

FOREIGN PATENT DOCUMENTS

JP H08318727 A 12/1996
JP H08318730 A 12/1996
(Continued)

*Primary Examiner* — Tan Q Nguyen
(74) *Attorney, Agent, or Firm* — Harness, Dickey & Pierce, P.L.C.

(57) ABSTRACT

An engine controller includes a reading section and a ratio-setting control section. The reading section is included in an air conditioner. The air conditioner draws an air into an air-conditioner housing, heats the air by a cooling water cooling the engine, and blows the air into a vehicle compartment. The reading section reads a state information that relates to a state of the air conditioner having an effect on an outside-air drawing ratio. The outside-air drawing ratio is a ratio of a volume of an outside air to a total volume of the outside air and an inside air. The ratio-setting control section decreases an amount of heat generated by the engine when the outside-air drawing ratio is a second ratio, which is smaller than a first ratio, to be smaller than an amount of heat generated by the engine when the outside-air drawing ratio is the first ratio.

10 Claims, 11 Drawing Sheets

(51) Int. Cl.
  *B60H 1/00* (2006.01)
  *F02D 41/02* (2006.01)
  *F01P 7/16* (2006.01)
  *B60H 1/06* (2006.01)
  *F02N 11/08* (2006.01)

(52) U.S. Cl.
  CPC .......... *B60H 1/00985* (2013.01); *B60H 1/04* (2013.01); *B60H 1/06* (2013.01); *F01P 7/16* (2013.01); *F02D 29/02* (2013.01); *F02D 41/021* (2013.01); *F02N 11/084* (2013.01); *B60H 1/00849* (2013.01); *F01P 2025/12* (2013.01); *F01P 2025/13* (2013.01); *F01P 2025/32* (2013.01); *F01P 2060/08* (2013.01)

(58) Field of Classification Search
  USPC ............................................................ 701/36
  See application file for complete search history.

(56) References Cited

U.S. PATENT DOCUMENTS

| | | | |
|---|---|---|---|
| 6,016,967 A | 1/2000 | Takechi et al. | |
| 6,021,957 A | 2/2000 | Takechi et al. | |
| 6,092,592 A | 7/2000 | Toyoshima et al. | |
| 6,110,035 A | 8/2000 | Uemura et al. | |
| 6,138,749 A | 10/2000 | Kawai et al. | |
| 6,142,864 A | 11/2000 | Uemura et al. | |
| 6,145,754 A | 11/2000 | Uemura et al. | |
| 6,189,604 B1 | 2/2001 | Yamauchi et al. | |
| 6,213,198 B1 | 4/2001 | Shikata et al. | |
| 6,311,763 B1 | 11/2001 | Uemura et al. | |
| 6,352,102 B1 | 3/2002 | Takechi et al. | |
| 6,622,787 B1 | 9/2003 | Toyoshima et al. | |
| 7,082,990 B1 | 8/2006 | Uemura et al. | |
| 10,166,841 B2 * | 1/2019 | Larson | B60H 1/3207 |
| 10,479,170 B2 * | 11/2019 | Enomoto | B60H 1/323 |
| 2003/0056531 A1 | 3/2003 | Nishida et al. | |
| 2006/0225875 A1 | 10/2006 | Uemura et al. | |
| 2009/0314847 A1 * | 12/2009 | Nemoto | B60H 1/00764 237/5 |
| 2010/0035534 A1 | 2/2010 | Kajiya | |
| 2012/0241126 A1 | 9/2012 | Kishi | |
| 2012/0252340 A1 | 10/2012 | Gannon et al. | |
| 2013/0008627 A1 | 1/2013 | Uemura | |
| 2013/0168458 A1 | 7/2013 | Ichishi et al. | |
| 2013/0319630 A1 | 12/2013 | Yamamoto et al. | |
| 2014/0045417 A1 | 2/2014 | Sakamoto et al. | |
| 2014/0144998 A1 * | 5/2014 | Ichishi | B60H 1/00314 237/12.3 A |
| 2016/0236535 A1 | 8/2016 | Kuwayama et al. | |

FOREIGN PATENT DOCUMENTS

| | | |
|---|---|---|
| JP | H09024723 A | 1/1997 |
| JP | H09156350 A | 6/1997 |
| JP | H10006740 A | 1/1998 |
| JP | H10071828 A | 3/1998 |
| JP | H10086637 A | 4/1998 |
| JP | H10086638 A | 4/1998 |
| JP | H10100643 A | 4/1998 |
| JP | H10175423 A | 6/1998 |
| JP | H10181331 A | 7/1998 |
| JP | H10181332 A | 7/1998 |
| JP | H10203135 A | 8/1998 |
| JP | H10217752 A | 8/1998 |
| JP | H10217758 A | 8/1998 |
| JP | H10230734 A | 9/1998 |
| JP | H10236128 A | 9/1998 |
| JP | H10250342 A | 9/1998 |
| JP | H10291408 A | 11/1998 |
| JP | H10324145 A | 12/1998 |
| JP | H10338019 A | 12/1998 |
| JP | H11005426 A | 1/1999 |
| JP | H11005427 A | 1/1999 |
| JP | H11078476 A | 3/1999 |
| JP | H11105528 A | 4/1999 |
| JP | H11105532 A | 4/1999 |
| JP | H11115448 A | 4/1999 |
| JP | H11115463 A | 4/1999 |
| JP | H11115468 A | 4/1999 |
| JP | H11115469 A | 4/1999 |
| JP | H11157321 A | 6/1999 |
| JP | H11170841 A | 6/1999 |
| JP | H11170849 A | 6/1999 |
| JP | H11208240 A | 8/1999 |
| JP | H11227448 A | 8/1999 |
| JP | H11334340 A | 12/1999 |
| JP | H11344239 A | 12/1999 |
| JP | 2000043543 A | 2/2000 |
| JP | 2000203250 A | 7/2000 |
| JP | 2000255824 A | 8/2000 |
| JP | 2000238524 A | 9/2000 |
| JP | 2000296712 A | 10/2000 |
| JP | 2001010327 A | 1/2001 |
| JP | 2001206044 A | 7/2001 |
| JP | 2001213134 A | 8/2001 |
| JP | 2002127729 A | 5/2002 |
| JP | 2003170725 A | 6/2003 |
| JP | 2003326951 A | 11/2003 |
| JP | 2004132342 A | 4/2004 |
| JP | 2009255895 A | 11/2009 |
| JP | 2009298323 A | 12/2009 |
| JP | 2010036834 A | 2/2010 |
| JP | 2010076515 A | 4/2010 |
| JP | 2011068296 A | 4/2011 |
| JP | 2012171489 A | 9/2012 |
| JP | 2012201236 A | 10/2012 |
| JP | 2012210932 A | 11/2012 |
| JP | 2012224197 A | 11/2012 |
| JP | 2012224205 A | 11/2012 |
| JP | 2013014284 A | 1/2013 |
| JP | 2014061789 A | 4/2014 |
| JP | 2014065334 A | 4/2014 |
| JP | 2015048808 A | 3/2015 |
| JP | 2015080959 A | 4/2015 |
| WO | WO-2012042751 A1 | 4/2012 |
| WO | WO-2017033661 A1 | 3/2017 |

* cited by examiner

FIG. 6

| NECESSARY AMOUNT Qn OF HEAT TO BE GENERATED BY ENGINE | = | Sw | Qd<br>DRIVE HEAT VALUE MAP<br>Ne | + | Two | Qc<br>REFERENCE REQUEST HEAT VALUE MAP<br>Tw |

$$Qc = H_1 \times Tr + H_2 \times Tam + H_3 \times P + H_4 \times Tw + H_5 \times Two + H_0$$

FIG. 12
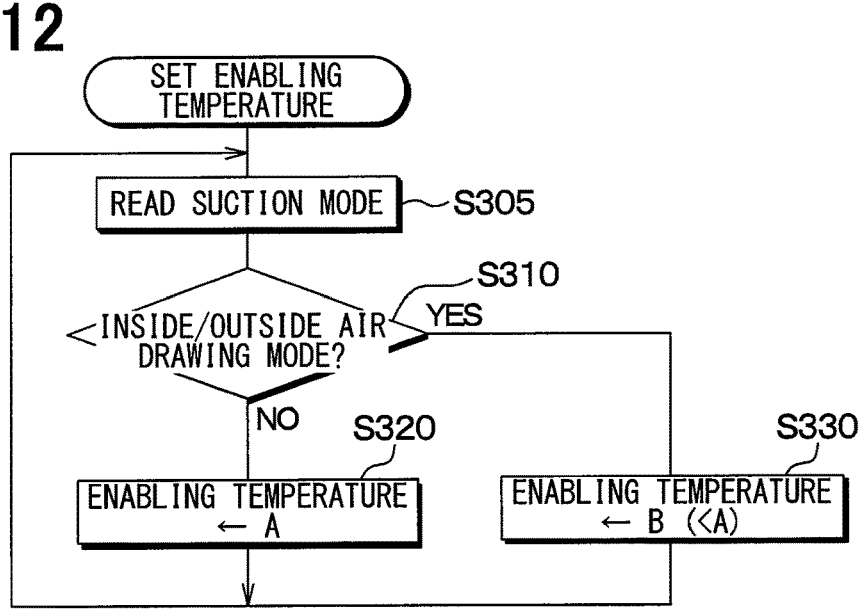
FIG. 13
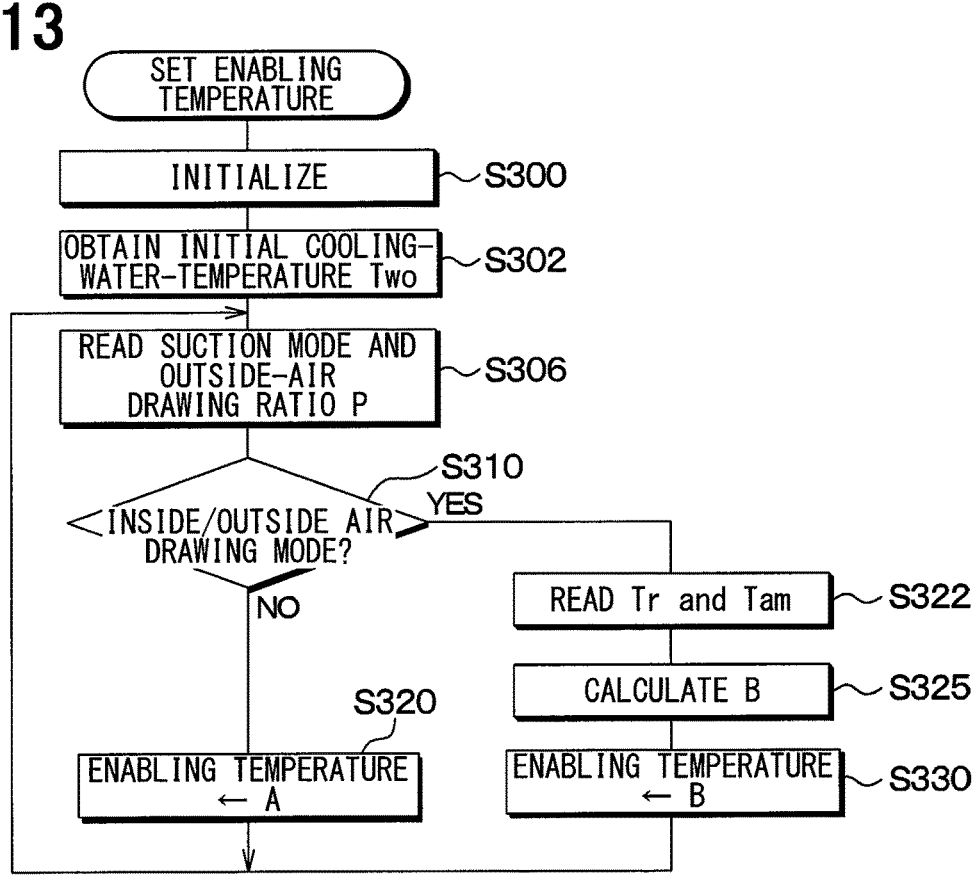
FIG. 14
$$B = J_1 \times Tr + J_2 \times Tam + J_3 \times P + J_4 \times Two + J_0$$

ENGINE CONTROLLER, AIR CONDITIONING SYSTEM, AND PROGRAM FOR AIR-CONDITIONING CONTROLLER

CROSS REFERENCE TO RELATED APPLICATIONS

This application is a U.S. National Phase Application under 35 U.S.C. 371 of International Application No. PCT/JP2016/073693 filed on Aug. 11, 2016 and published in Japanese as WO 2017/047302 A1 on Mar. 23, 2017. This application is based on and claims the benefit of priority from Japanese Patent Application No. 2015-182169 filed on Sep. 15, 2015. The entire disclosures of all of the above applications are incorporated herein by reference.

TECHNICAL FIELD

The present disclosure relates to an engine controller, an air conditioning system, and a program for an air-conditioning controller.

BACKGROUND ART

There has been known an air conditioner that heats air by using cooling water for an engine. When the air conditioner of this type introduces outside air, which is air outside a vehicle compartment, and blows the outside air into the vehicle compartment, the air-conditioner heats the outside air by using the cooling water. In this case, since the cooling water is deprived of heat by the outside air, the increase in the temperature of the cooling water is slow. As a result, a heating effect cannot be obtained quickly.

Therefore, a temperature increase control is known in which the engine is controlled such that the temperature of cooling water is further increased than usual in winter or such a period when inside-air temperature and outside-air temperature are low (refer to, for example, Patent Literature 1).

PRIOR ART LITERATURES

Patent Literature

Patent Literature 1: JP 2015-048808 A

SUMMARY OF INVENTION

However, as a result of diligent research, the inventors of the present invention discovered that, even in a case where outside air is introduced, heated, and then blown into a vehicle compartment, the degree of necessity for temperature increase control changes according to the outside-air drawing ratio. The present disclosure has been made in view of the situation described above and it is an object of the present disclosure to provide a technique for adjusting the amount of heat generated by the engine according to the outside-air drawing ratio in a vehicle in which the heating is performed by cooling water of the engine.

According to an aspect of the present disclosure, an engine controller controls an operation of an engine that generates power for moving a vehicle. The engine controller includes a reading section and a ratio-setting control section. The reading section is included in an air conditioner. The air conditioner draws an air into an air-conditioner housing, heats the air by using a cooling water cooling the engine, and blows the air into a vehicle compartment of the vehicle. The reading section reads a state information that relates to a state of the air conditioner having an effect on an outside-air drawing ratio. The outside-air drawing ratio is a ratio of a volume of an outside air, which is drawn into the air-conditioner housing from an outside of the vehicle compartment, to a total volume of the outside air and an inside air, which is drawn into the air-conditioner housing from an inside of the vehicle compartment. The ratio-setting control section controls an operation of the engine based on the state information read by the reading section, thereby decreasing an amount of heat generated by the engine when the outside-air drawing ratio is a second ratio, which is smaller than a first ratio, to be smaller than an amount of heat generated by the engine when the outside-air drawing ratio is the first ratio.

As described above, the engine controller controls the engine based on the state information relating to a state of the air conditioner having an effect on the outside-air drawing ratio such that the amount of heat, which is generated by the engine when the outside-air drawing ratio is the second ratio smaller than the first ratio, becomes smaller than the amount of heat, which is generated by the engine when the outside-air drawing ratio is the first ratio. Therefore, the amount of heat generated by the engine can be adjusted depending on the outside-air drawing ratio in the vehicle that performs a heating operation using the cooling water cooling the engine. As a result, a change rate of a temperature of the cooling water can be adjusted depending on the outside-air drawing ratio.

According to another aspect of the present disclosure, an air-conditioning system adjusts a temperature in a vehicle compartment of a vehicle. The air-conditioning system includes an air conditioner and an air-conditioning controller. The air conditioner is mounted to the vehicle and has an air-conditioning housing. The air conditioner draws air into the air-conditioning housing and blows the air into the vehicle compartment after heating the air by using a cooling water cooling the engine. The air-conditioning controller controls an operation of the air conditioner. The vehicle mounts an engine generating power and moving the vehicle and an engine controller controlling the engine. The air-conditioning controller includes a state setting section and an information sending section. The state setting section sets a state of the air conditioner having an effect on an outside-air drawing ratio. The outside-air drawing ratio being a ratio of a volume of an outside air, which is drawn into the air-conditioner housing from an outside of the vehicle compartment, to a total volume of the outside air and an inside air, which is drawn into the air-conditioner housing from an inside of the vehicle compartment. The information sending section sends a state information relating to the state, which is set by the state setting section, to the engine controller, thereby decreasing an amount of heat, which is generated by the engine when the outside-air drawing ratio is a second ratio smaller than a first ratio, to be smaller than an amount of heat, which is generated by the engine when the outside-air drawing ratio is the first ratio.

As described above, the air conditioning system sends the state information relating to the state of the air conditioner having an effect on the outside-air drawing ratio. As a result, the amount of heat, which is generated by the engine when the outside-air drawing ratio is the second ratio smaller than the first ratio, becomes smaller than the amount of heat, which is generated by the engine when the outside-air drawing ratio is the first ratio. Therefore, the amount of heat generated by the engine can be adjusted depending on the outside-air drawing ratio in the vehicle that performs a heating operation using the cooling water cooling the engine.

According to another aspect of the present disclosure, a program for an air-conditioning controller controls an air conditioner including an air-conditioning housing. The air conditioner is mounted to a vehicle that mounts an engine generating power and moving the vehicle and an engine controller controlling the engine. The air conditioner draws air into the air-conditioning housing and blows the air into a vehicle compartment of the vehicle after heating the air by using a cooling water cooling the engine. The program operates the air-conditioning controller to perform as a state setting section and an information sending section. The state setting section sets a state of the air conditioner having an effect on an outside-air drawing ratio. The outside-air drawing ratio is a ratio of a volume of an outside air, which is drawn into the air-conditioner housing from an outside of the vehicle compartment, to a total volume of the outside air and an inside air, which is drawn into the air-conditioner housing from an inside of the vehicle compartment. The information sending section sends a state information relating to the state, which is set by the state setting section, to the engine controller, thereby decreasing an amount of heat, which is generated by the engine when the outside-air drawing ratio is a second ratio smaller than a first ratio, to be smaller than an amount of heat, which is generated by the engine when the outside-air drawing ratio is the first ratio.

As described above, the air-conditioning controller sends the state information relating to the state of the air conditioner having an effect on the outside-air drawing ratio. As a result, the amount of heat, which is generated by the engine when the outside-air drawing ratio is the second ratio smaller than the first ratio, becomes smaller than the amount of heat, which is generated by the engine when the outside-air drawing ratio is the first ratio. Therefore, the amount of heat generated by the engine can be adjusted depending on the outside-air drawing ratio in the vehicle that performs a heating operation using the cooling water cooling the engine.

BRIEF DESCRIPTION OF DRAWINGS

FIG. 2 is a view illustrating configurations of a dual-use controller and so on.

FIG. 6 is a view showing relations between an amount Qd of heat generated by an engine for driving, an additional amount Qc of heat required to be generated by the engine, and a necessary amount Qn of heat to be generated by the engine.

FIG. 12 is a flowchart of an enabling-temperature setting section.

FIG. 13 is a flowchart of an enabling-temperature setting section in a fifth embodiment.

FIG. 14 is a calculation formula for a value B.

DESCRIPTION OF EMBODIMENTS

First Embodiment

Figure 1:
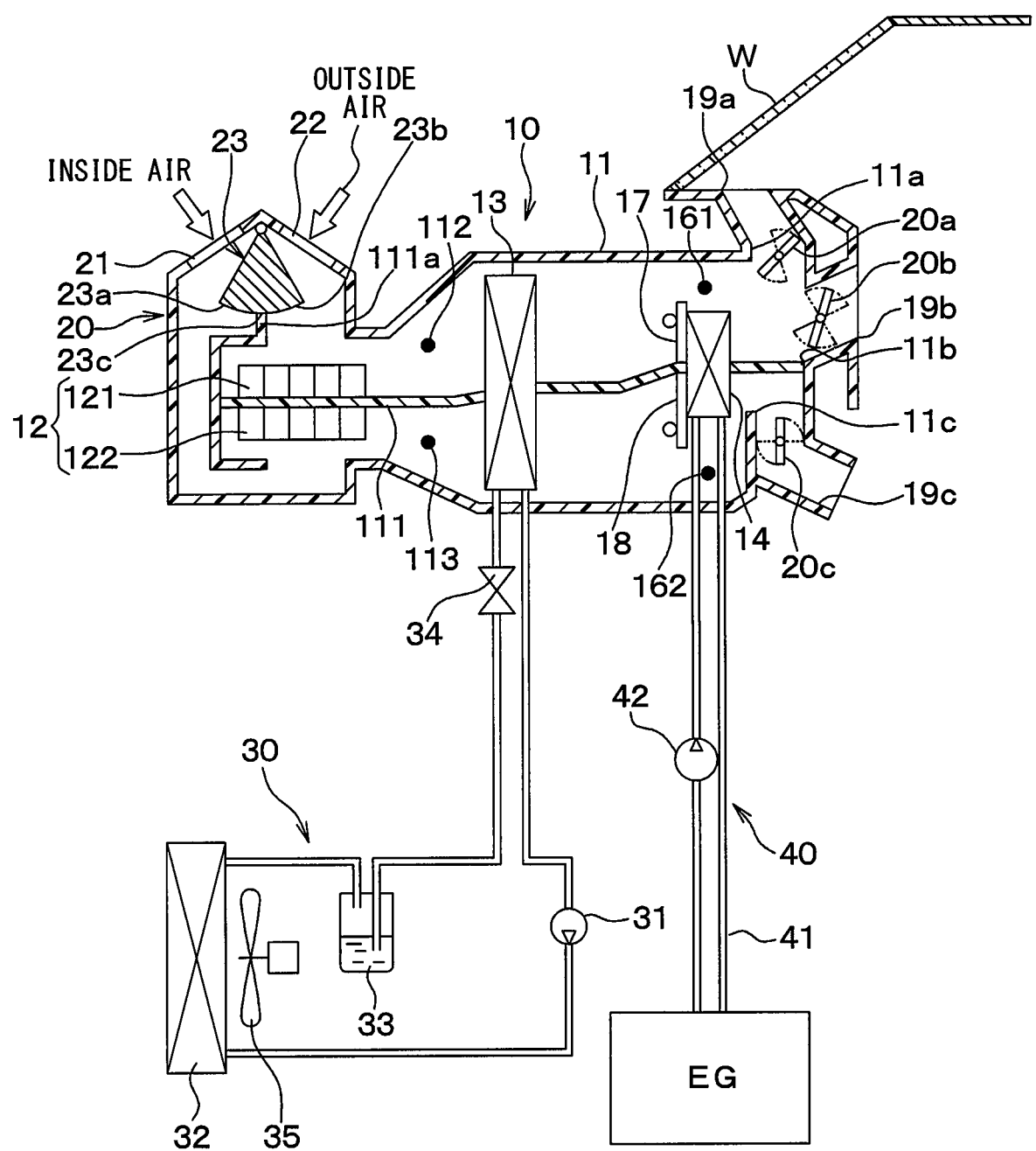
FIG. 1 is a view illustrating configurations of an air conditioner and so on according to a first embodiment.

A first embodiment will be described below. An on-vehicle system according to the present embodiment is mounted in a vehicle. As shown in FIG. 1, the on-vehicle system has an engine EG and an air conditioner. The engine EG is an internal combustion engine that generates the drive power that causes the vehicle to move. The air conditioner has an interior air-conditioning unit 10 and a refrigeration cycle 30 shown in FIG. 1. The interior air-conditioning unit 10 and the refrigeration cycle 30 configure the air conditioner. The air conditioner and a dual-use controller, which is described below, configure an air-conditioning system.

The interior air-conditioning unit 10 draws an air, which is an outside air or an inside air, then heats or cools the air, and blows the air into a vehicle compartment. Thus, the inside of the vehicle compartment is air-conditioned. The outside air is an air outside the vehicle compartment, and the inside air is air inside the vehicle compartment.

As shown in FIG. 1, the interior air-conditioning unit 10 includes an air-conditioner housing 11, a fan 12, an evaporator 13, a heater core 14, and so on. The air-conditioner housing 11, forming an outer shell for the interior air-conditioning unit 10 houses the fan 12, the evaporator 13, the heater core 14, and so on. The interior air-conditioning unit 10 is disposed inside an instrument panel in the foremost part in the vehicle compartment.

The air-conditioner housing 11 has therein an air passage for air to be blown into the vehicle compartment. The air-conditioner housing 11 in the present embodiment has therein a partition plate 111 that divides the air passage in the air-conditioner housing 11 into two air passages: a first air passage 112 on the upper side and a second air passage 113 on the lower side. The partition plate 111 separates the first air passage 112 and a second air passage 113.

The fan (i.e., a blower) 12 blows air toward the inside of the vehicle compartment. The fan 12 includes a first blower fan 121 and a second blower fan 122, each including a centrifugal multi-blade fan (specifically, a sirocco fan). The first blower fan 121 and the second blower fan 122 are rotatably housed in a first scroll casing and a second scroll casing (not shown), respectively, which are arranged in the first air passage 112 and the second air passage 113 respectively.

Thus, a first air, which is air blown by the first blower fan 121, circulates in the first air passage 112, whereas a second air, which is air blown by the second blower fan 122, circulates in the second air passage 113.

In addition, in the present embodiment, an inside/outside air switching box 20 is disposed on the upstream side of the fan 12 in a flow direction of air and on the most upstream side of the air-conditioner housing 11 in the flow direction of air. The inside/outside air switching box 20 is included in the interior air-conditioning unit 10. For air to be introduced to the suction sides of the first blower fan 121 and the second blower fan 122, the inside/outside air switching box 20 switches between outside air and the inside air.

The inside/outside air switching box 20 has an inside-air inlet 21 and an outside-air inlet 22. The inside air is drawn into the inside/outside air switching box 20 from the inside-air inlet 21. The outside air is drawn into the inside/outside air switching box 20 from the outside-air inlet 22.

An inside/outside air switching door 23 is disposed in the inside/outside air switching box 20. The inside/outside air switching door 23 is also included in the interior air-conditioning unit 10. As shown in FIG. 1, the inside/outside air switching door 23 is a columnar member that has a sector shape in cross section. The inside/outside air switching door 23 rotates about a rotational axis, which corresponds to a center of a circle defined by an arc portion of the sector shape.

The inside/outside air switching door 23 rotates to continuously adjust an opening area of the inside-air inlet 21 and an opening area of the outside-air inlet 22. The suction mode and the outside-air drawing ratio are changed when the inside-outside air switching door 23 changes the opening areas. The outside-air drawing ratio is a ratio of a volume of an outside air drawn into the air-conditioner housing from an outside of the vehicle compartment to a total volume of the outside air and the inside air drawn into the air-conditioner housing from an inside of the vehicle compartment. The volume of the inside air is a volume of air flowing into the inside/outside air switching box 20 from the inside-air inlet 21. The volume of the outside air is a volume of air flowing into the inside/outside air switching box 20 from the outside-air inlet 22.

The suction mode includes an inside-air drawing mode, an outside-air drawing mode, and an inside/outside air drawing mode. In the inside-air drawing mode, mostly the inside air is drawn into the first air passage 112 and the second air passage 113 and blown into the vehicle compartment. In the outside-air drawing mode, mostly the outside air is drawn into the first air passage 112 and the second air passage 113 and blown into the vehicle compartment.

In the inside-air drawing mode, one end 23a of the arc portion of the sector shape faces a most-upstream end 111a of the partition plate 111. Consequently, introduction of outside air from the outside-air inlet 22 is blocked. That is, only inside air is drawn into the inside/outside air switching box 20 from the inside-air inlet 21. In the inside-air drawing mode, the outside-air drawing ratio is 5% or less (for example, 0%).

In the outside-air drawing mode, an other end 23b of the arc portion of the sector shape faces the most-upstream end 111a of the partition plate 111. As a result, introduction of inside air from the inside-air inlet 21 is blocked. That is, only outside air is drawn into the inside/outside air switching box 20 from the outside-air inlet 22. In the outside-air drawing mode, the outside-air drawing ratio is 95% or more (for example, 100%).

In the inside/outside air drawing mode, a portion 23c of the arc portion of the sector shape and between the one end 23a and the other end 23b faces the most-upstream end 111a of the partition plate 111. As a result, inside air and outside air are drawn into the inside/outside air switching box 20 from the inside-air inlet 21 and the outside-air inlet 22, respectively. In this case, an entirety of the inside air drawn from the inside-air inlet 21 is introduced into the second air passage 113, and an entirety of the outside air drawn from the outside-air inlet 22 is introduced into the first air passage 112. That is, an entirety of air introduced into the first air passage 112 is the outside air, and an entirety of air introduced into the second air passage 113 is the inside air.

In the inside/outside air drawing mode, the outside-air drawing ratio changes according to the position of the inside/outside air switching door 23. Specifically, the outside-air drawing ratio increases as the inside/outside air switching door 23 becomes closer to the inside-air inlet 21. Conversely, the outside-air drawing ratio decreases as the inside/outside air switching door 23 becomes closer to the outside-air inlet 22. The outside-air drawing ratio in the inside/outside air drawing mode is greater than 0% but less than 100%.

In the outside-air drawing mode, an extractor, not shown, communicates with the outside of the vehicle compartment. In this case, inside air is discharged outside the vehicle compartment through the extractor. In the inside-air drawing mode and the inside/outside air drawing mode, the extractor is blocked from reaching the outside of the vehicle compartment. In this case, inside air is not discharged outside the vehicle compartment from inside the vehicle compartment but circulates.

The evaporator 13 is disposed downstream of the fan 12 in the flow direction of air. Together with a compressor 31, a condenser 32, a gas-liquid separator 33, an expansion valve 34, and so on, the evaporator 13 configures the refrigeration cycle 30.

The compressor 31 is disposed in an engine room, sucks in, compresses, and discharges refrigerant in the refrigeration cycle 30. The condenser 32 is disposed in the engine room, and condenses and liquefies the compressed refrigerant by performing heat exchange between the refrigerant internally circulating and outside air blown from a blower fan 35 serving as an exterior fan. The blower fan 35 is an electric fan. The gas-liquid separator 33 separates the condensed and liquefied refrigerant into a gas phase refrigerant and a liquid phase refrigerant and then causes only the liquid phase refrigerant to flow downstream. The expansion valve 34 decompresses and expands the liquid phase refrigerant flowed from the gas-liquid separator 33.

The evaporator 13 evaporates the refrigerant expanded by the expansion valve 34 after compression by the compressor 31 in the refrigeration cycle 30, and performs heat exchange between the refrigerant and air, thereby cooling air which is blown from the first blower fan 121 and the second blower fan 122.

The evaporator 13 is disposed so as to extend through a through-hole formed in the partition plate 111. A portion of the evaporator 13 located in the first air passage 112 is an upper heat exchanging portion. A portion of the evaporator 13 located in the second air passage 113 is a lower heat exchanging portion. The first air is cooled in the upper heat exchanging portion of the evaporator 13. The second air is cooled in the lower heat exchanging portion of the evaporator 13.

The heater core 14 is positioned downstream of the evaporator 13 in the flow direction of air. The heater core 14 is a heating heat exchanger that heats air after passing through the evaporator 13 by performing a heat exchange between cooling water used for the engine EG and the air after passing through the evaporator 13. That is, the heater core 14 heats air by using heat generated by the engine EG.

A cooling water circuit 40 is formed to connect the heater core 14 and the engine EG, and the cooling water circulates in the cooling water circuit 40. A cooling-water passage 41 and an electric water pump 42 that circulates cooling water are disposed in the cooling water circuit 40. The electric water pump 42 is an electric water pump the number of rotations of which is controlled by a control voltage output from an air-conditioning controller 50. A volume of cooling water circulated in the cooling water circuit 40 is determined according to the number of rotations.

The heater core 14 is disposed so as to extend through a through-hole formed in the partition plate 111. A portion of the heater core located in the first air passage 112 is an upper heating portion. A portion of the heater core 14 located in the second air passage 113 is a lower heating portion. The first air is heated in the upper heating portion of the heater core 14. The second air is heated in the lower heat exchanging portion of the heater core 14.

A first bypass passage 161 is provided on an upper side of the heater core 14 in the first air passage 112. The first air, after passing through the upper heat exchanging portion of the evaporator 13, flows in the first bypass passage 161 while bypassing the upper heating portion of the heater core 14. The first air after passing through the first bypass passage 161 is mixed with the first air heated in the heater core 14 in a space defined on a downstream side of the heater core 14 in the flow direction of air inside the first air passage 112.

A second bypass passage 162 is provided on a lower side of the heater core 14 in the second air passage 113. The second air, after passing through the lower heat exchanging portion of the evaporator 13, flows in the second bypass passage 113 while bypassing the lower heating portion of the heater core 14. The second air after passing through the second bypass passage 162 is mixed with the second air heated in the heater core 14 in a space defined on a downstream side of the heater core 14 in the flow direction of air inside the second air passage 113.

A first air mix door 17 is positioned between the evaporator 13 and the heater core 14 in the first air passage 112. A second air mix door 18 is positioned between the evaporator 13 and the heater core 14 in the second air passage 113. The first air mix door 17 is a member that adjusts the flow rate (i.e., an air mixing ratio) of the volume of air passing through the upper heat exchanging portion of the heater core 14 to the volume of air passing through the first bypass passage 161, in the air passing through the evaporator 13. The second air mix door 18 is a member that adjusts the flow rate (i.e., an air mixing ratio) of the volume of air passing through the lower heat exchanging portion of the heater core 14 to the volume of air passing through the second bypass passage 162, in the air passing through the evaporator 13.

A defroster opening 11a, a face opening 11b, and a foot opening 11c are formed in the furthest downstream area of the air-conditioner housing 11 in the flow direction of air. Air, which is to be blown into the vehicle compartment, flows out of the air-conditioner housing 11 through the defroster opening 11a, the face opening 11b, and the foot opening 11c.

The defroster opening 11a is an opening through which air flowing in the air-conditioner housing 11 is guided to a windshield W of the vehicle. The defroster opening 11a is connected via a blow duct to a defroster air outlet 19a disposed in the vehicle compartment. Temperature adjusted air is blown from the defroster air outlet 19a toward an inner surface of the windshield W.

The face opening 11b is an opening through which air flowing in the air-conditioner housing 11 is guided to the upper body of a passenger. The face opening 11b is connected to a face air outlet 19b disposed in the vehicle compartment via a blow duct. Temperature adjusted air is blown from the face air outlet 19b toward the upper body of a passenger.

The foot opening 11c is an opening through which air flowing in the air-conditioner housing 11 is guided to the lower body, especially the feet, of a passenger. The foot opening 11c is connected to a foot air outlet 19c via a blow duct. Temperature adjusted air is blown from the foot air outlet 19c toward the feet of a passenger. A defroster door 20a, a face door 20b, and a foot door 20c are arranged upstream of the openings 11a, 11b, and 11c, respectively, so as to freely rotate.

Examples of blowing mode switched by each of the doors 20a, 20b, and 20c include a face mode, a bi-level mode, and a foot-defroster mode. In the face mode, the face opening 11b fully opens, so that air is blown from the face air outlet 19b toward the upper body of a passenger. In the bi-level mode, both the face opening 11b and the foot opening 11c are opened, so that air is blown toward the upper and lower bodies of a passenger in the vehicle compartment. In the foot-defroster mode, the foot opening 11c fully opens and the defroster opening 11a opens only to a small degree, so that air is blown mainly from the foot air outlet 19c.

A description is given using an example where the suction mode is set at the inside/outside air drawing mode, and the blowing mode is set at the foot-defroster mode or bi-level mode. In this case, outside air introduced into the first air passage 112 is blown upwards in the vehicle compartment via the defroster opening 11a or the face opening 11b, and inside air introduced into the second air passage 113 is blown downwards in the vehicle compartment via the foot opening 11c.

Figure 2:
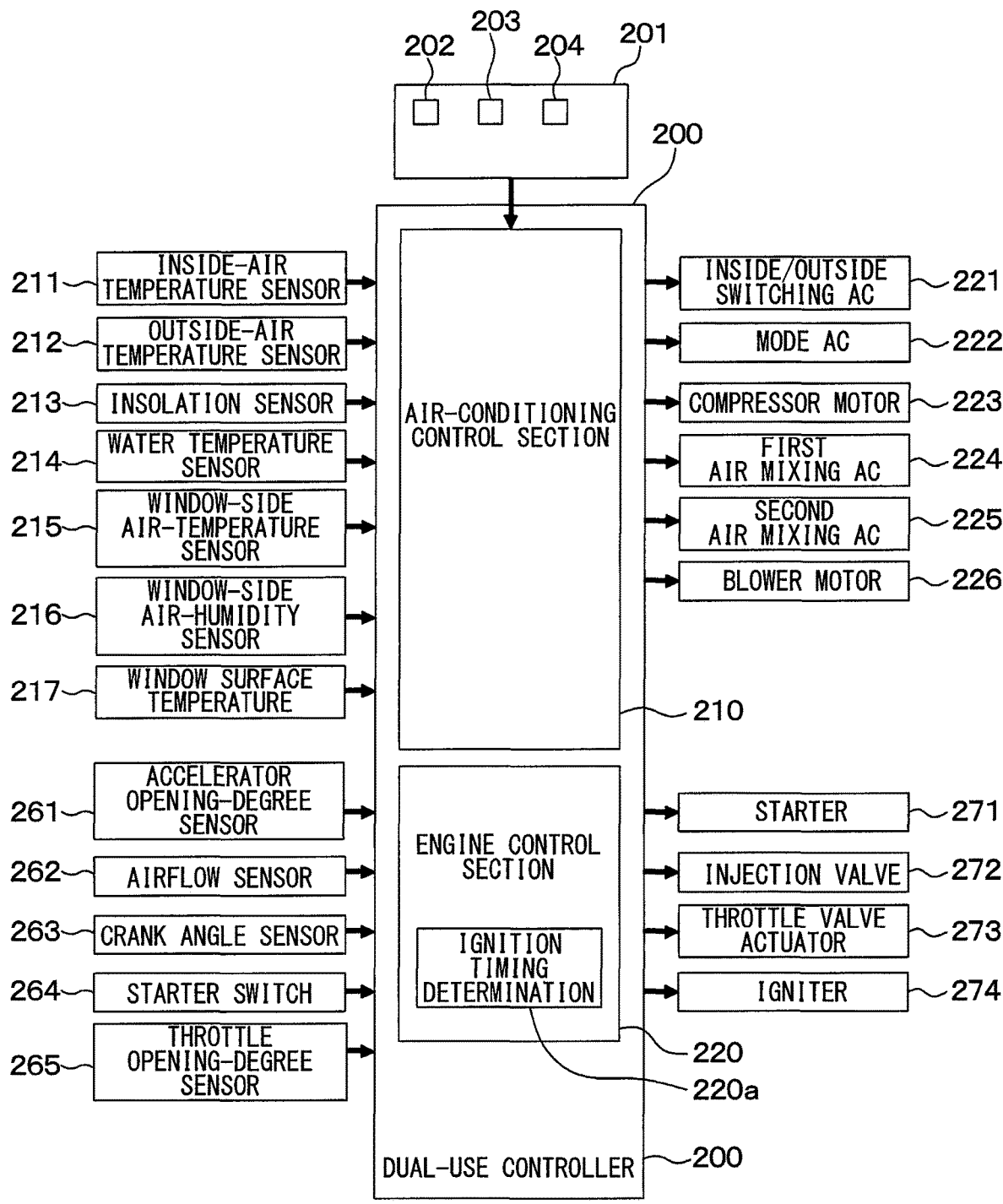

The on-vehicle system according to the present embodiment has the dual-use controller 200 and, in addition, various sensors 211, 212, 213, 214, 215, 216, 217, 261, 262, and 263 and various actuators 221, 222, 223, 224, 225, 226, 271, 272, 273, and 274, shown in FIG. 2.

The dual-use controller 200 includes a well-known micro-computer including a CPU, ROM, flash memory, I/O, etc., and peripheral circuits for the micro-computer. The CPU executes a program recorded in the ROM. Due to the execution, the CPU simultaneously executes an air-conditioning control section 210 and an engine control section 220 in parallel in a multi-task process. A process performed by the CPU will be described as a process executed by the dual-use controller 200. It is noted that the dual-use controller 200 corresponds to an engine controller and an air-conditioning controller.

An inside-air temperature sensor 211 detects air temperature in the vehicle compartment, more specifically, air temperature in an instrument panel. An outside-air temperature sensor 212 detects air temperature outside the vehicle compartment. An insolation sensor 213 detects the insolation amount. A water temperature sensor 214 detects the temperature of the cooling water flowing in the cooling-water passage 41. A window-side air-temperature sensor 215 detects a temperature of air near the windshield W inside the vehicle compartment. A window-side air-humidity sensor 216 216 detects relative humidity of air near the windshield W inside the vehicle compartment. A window surface temperature sensor 217 detects a temperature of the inner surface of the windshield W inside the vehicle compartment.

An inside/outside switching actuator 221 is a motor that adjusts the position of the inside/outside air switching door 23. A mode actuator 222 is a motor that adjusts the positions of the defroster door 20a, the face door 20b, and the foot door 20c. A compressor motor 223 is a motor that drives the compressor 31. A first air mixing actuator 224 is a motor that adjusts the position of the first air mix door 17. A second air mixing actuator 225 is a motor that adjusts the position of the second air mix door 18. A blower motor 226 is a motor that drives the first and second blower fans 121, 122.

An accelerator opening-degree sensor 261 detects an operation amount of an accelerator pedal depressed by the driver of the vehicle. An airflow sensor 262 detects a flow rate of air passing through an intake pipe of the engine EG. A crank angle sensor 263 outputs a crank pulse signal corresponding to a crank angle. A starter switch 264 is a switch that is operated by a user to start the engine EG. A throttle opening-degree sensor 265 detects an opening degree of a throttle valve. The throttle valve adjusts the flow rate of air sent into the engine from the intake pipe.

A starter 271 cranks to start the engine. An injection valve 272 injects fuel to be supplied to the engine. A throttle valve actuator 273 controls the opening degree of the throttle valve. An igniter 274 burns gaseous mixture fed into the engine from the intake pipe.

In addition, as shown in FIG. 2, an operation panel 201 has an air-conditioning operation switch 202, a selection switch 203 for an operation mode, and a setting switch 204 for a temperature in the vehicle compartment.

Figure 3:
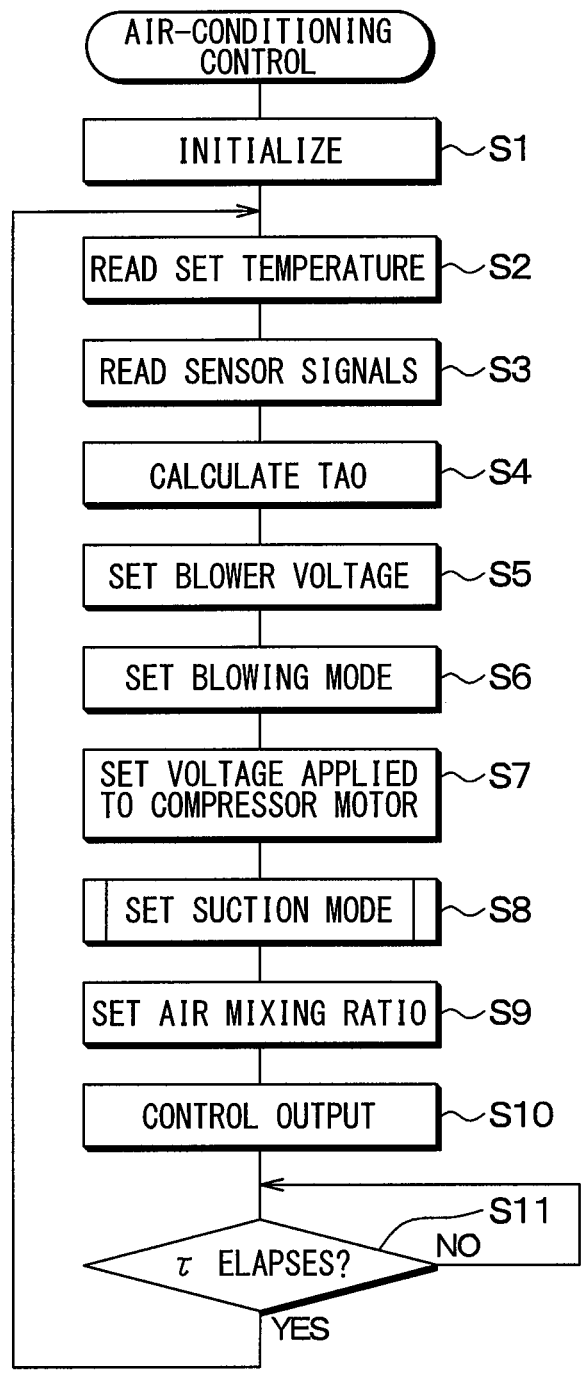
FIG. 3 is a flowchart for an air-conditioning control section executed by a shared controller.

The air-conditioning control section 210 will be described. The dual-use controller 200 initiates the air-conditioning control section 210 after the IG of the vehicle is turned on. Then, in the air-conditioning control section 210, the dual-use controller 200 executes the process shown in FIG. 3.

First, at step S1, various data are initialized. At step S2, a set temperature Tset is read on the basis of the content of a user's operation of the setting switch 204 for temperature in the vehicle compartment.

At step S3, necessary information is read from various sensors shown in FIG. 2. At step S4, a target blowing temperature TAO is determined on the basis of the formula below.

$$TAO = Kset \times Tset - Kr \times Tr - Kam \times Tam - Ks \times Ts + C$$

Tr represents temperature in the vehicle compartment (i.e., an inside-air temperature), detected by the inside-air temperature sensor 211. In addition, Tam represents air temperature outside the vehicle compartment (i.e., an outside-air temperature), detected by the outside-air temperature sensor 212. Ts represents the insolation amount detected by the insolation sensor 213. Kset, Kr, Kam, and Ks are constants indicating control gains and C is a constant for correction.

At step S5, a value of voltage, i.e., a blower voltage, to be applied to the blower motor 226 is set based on the target blowing temperature TAO, a temperature of the cooling water, which is detected by the water temperature sensor 214, and the blowing mode. A rotational speed of the first blower fan 121 and a rotational speed of the second blower fan 122 increase as the blower voltage increases.

At step S6, one of the face mode, the bi-level mode, the foot mode, and the foot-defroster mode is set to the blowing mode based on the target blowing temperature TAO and a relative humidity RHW.

The relative humidity RHW is a relative humidity of the inner surface of the windshield W inside the vehicle compartment. The dual-use controller 200 calculates the relative humidity RHW by using a well-known method based on detection results of the window-side air-temperature sensor 215, the window-side air-humidity sensor 216, and the window surface temperature sensor 217.

At step S6, in a case where the relative humidity RHW is lower than a reference humidity, the dual-use controller 200 selects, as a present blowing mode, one of the face, bi-level, foot, modes on the basis of the target blowing temperature TAO. In a case where the relative humidity RHW is equal to or higher than the reference humidity, the dual-use controller 200 selects the foot-defroster mode as the present blowing mode.

At step S7, the value of a voltage to be applied to the compressor motor 223 is set on the basis of the target blowing temperature TAO, and so on. A rotational speed of the compressor motor 223 increases as the value of the voltage rises. Therefore, the larger the value of the voltage is, the more the ability of the compressor 31 to discharge refrigerant improves.

At step S8, a suction mode is set. Specifically, as shown in FIG. 4, first at step S81, a temporary mode is set on the basis of the target blowing temperature TAO.

Figure 4:
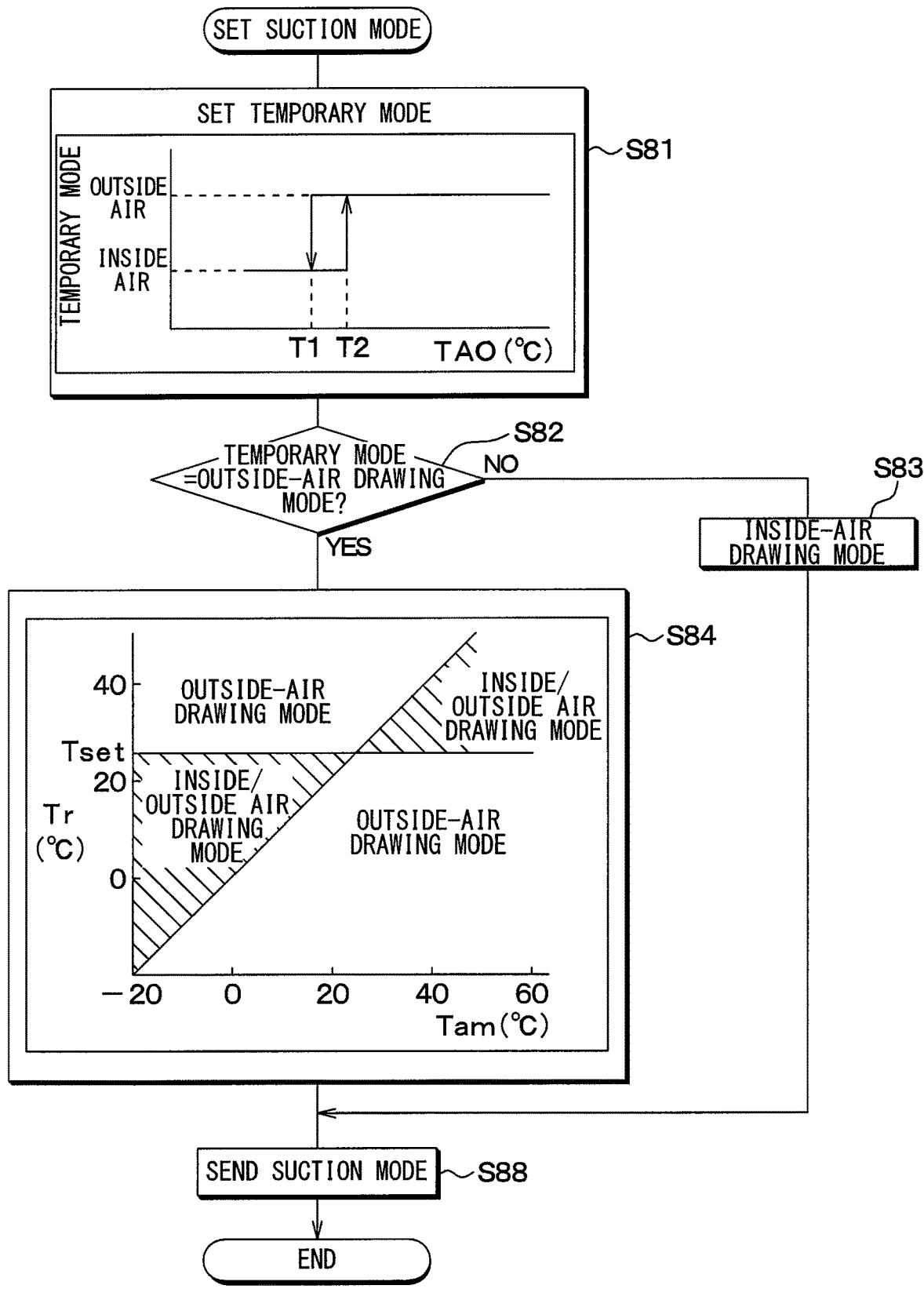
FIG. 4 is a flowchart of a process of determining a suction mode.

Specifically, as shown in FIG. 4, in a case where the temporary mode is the outside-air drawing mode and the target blowing temperature TAO is lower than a first reference temperature T1, the temporary mode is switched to the inside-air drawing mode. Conversely, in a case where the temporary mode is the outside-air drawing mode and the target blowing temperature TAO is equal to or higher than the first reference temperature T1, the temporary mode is switched to the outside-air drawing mode.

In a case where the temporary mode is the inside-air drawing mode and the target blowing temperature TAO is lower than a second reference temperature T2, the temporary mode is switched to the inside-air drawing mode. Conversely, in a case where the temporary mode is the inside-air drawing mode and the target blowing temperature TAO is equal to or higher than the second reference temperature T2, the temporary mode is switched to the outside-air drawing mode. It is noted that the first reference temperature T1 is lower than the second reference temperature T2.

At step S82, it is determined whether the temporary mode is the outside-air drawing mode. In a case where the temporary mode is not the outside-air drawing mode, the process proceeds to S83. In a case where the temporary mode is the outside-air drawing mode, the process proceeds to S84. At step S83, it is determined that the suction mode is the inside-air drawing mode, and the process proceeds to step S88.

At step S84, the suction mode is determined on the basis of the outside-air temperature Tam, the inside-air temperature Tr, and the set temperature Tset.

Specifically, in a case where the inside-air temperature Tr is higher than the set temperature Tset as shown in a map in FIG. 4, a determination is made in the manner described below. That is, in a case where the outside-air temperature Tam is higher than the inside-air temperature Tr, it is determined that the suction mode is the inside/outside air drawing mode. Conversely, in a case where the inside-air temperature Tr is higher than the outside-air temperature Tam, it is determined that the suction mode is the outside-air drawing mode.

In a case where the inside-air temperature Tr is equal to or lower than the set temperature Tset (e.g., 25° C.) as shown in the map in FIG. 4, a determination is made in the manner described below. That is, in a case where the outside-air temperature Tam is higher than the inside-air temperature Tr, it is determined that the suction mode is the outside-air drawing mode. In a case where the inside-air temperature Tr is higher than the outside-air temperature Tam, it is determined that the suction mode is the inside/outside air drawing mode. Thus, in a case where the vehicle compartment is heated after the vehicle has been parked for many hours, for example, at night in winter, more inside air is circulated in the inside/outside air drawing mode than in the outside-air drawing mode, and thus heating efficiency can be increased. After step S84, the process proceeds to step S88.

At step S88, the engine control section 220 is notified of the determined suction mode. For example, information about the suction mode may be recorded in an address to which reference is made by the engine control section 220 in the RAM. After step S88, the process proceeds to step S9 in FIG. 3.

At step S9, the air mixing degree of the first air mix door 17 and the air mixing degree of the second air mix door 18 are set on the basis of the target blowing temperature TAO, the suction mode, and the blowing mode.

At step S10, the actuators 221, 222, 223, 224, 225, and 226 are controlled so as to achieve the controlled states determined at steps S4, S5, S6, S7, S8, and S9 described above. At this time, in a case where the suction mode is the inside/outside air drawing mode, the dual-use controller 200 controls the inside/outside switching actuator 221 such that the inside/outside air switching door 23 is located at a position where the outside-air drawing ratio is a fixed ratio (for example 50%).

The dual-use controller 200 waits for a control period T, e.g., for 250 milliseconds, and returns to step S2 when determining the control period T elapses. In this way, the dual-use controller 200 periodically repeats the processing of steps S2 to S10 in the air-conditioning control section 210.

The engine control section 220 will be described hereafter. When the starter switch 264 is operated in the engine control section 220, the dual-use controller 200 controls the starter 271 and starts the engine EG. In addition, in the engine control section 220, the dual-use controller 200 determines the amount of fuel to be injected, the timing of fuel injection, the opening degree of the throttle, the timing of ignition, etc., on the basis of various parameters during operation of the engine EG. The various parameters include the opening degree of the accelerator detected by the accelerator opening-degree sensor 261, the air flow rate detected by the airflow sensor 262, a rotational speed Ne of the engine EG, which is determined based on a crank pulse signal from the crank angle sensor 263, and the cooling-water temperature of the cooling water detected by the water temperature sensor 214. The injection valve 272, the throttle valve actuator 273, the igniter 274, etc., are controlled so as to achieve the amount of fuel to be injected, the timing of fuel injection, the opening degree of the throttle valve, the timing of ignition, etc.

An ignition timing determination 220a in the engine control section 220 will be described in detail with reference to FIG. 5.

At step S205, the dual-use controller 200, after being started by turning on the ignition switch, initializes a variable. The dual-use controller 200 then waits for the engine EG to start. When the engine EG starts, the dual-use controller 200 obtains an initial cooling-water-temperature Two based on a detection result of the water temperature sensor 214 at step S210. The initial cooling-water-temperature Two is the temperature of the engine cooling water when the engine EG starts.

At step S215, the inside-air temperature Tr detected by the inside-air temperature sensor 211 is read. At step S220, the outside-air temperature Tam detected by the outside-air temperature sensor 212 is read. At step S225, the result of detection by the water temperature sensor 214 at the present time is read as the present water temperature Tw.

At step S230, the rotational speed Ne of the engine EG is determined based on a crank pulse signal output from the crank angle sensor 263. At step S235, the dual-use controller 200 reads an opening degree Sw of the throttle detected by the throttle opening-degree sensor 265. The opening degree Sw of the throttle corresponds to load on the engine EG.

At step S240, it is determined whether the initial cooling-water-temperature Two is lower than 0° C. The initial cooling-water-temperature Two may be lower than 0° C., for example, when the vehicle is parked for many hours during a winter night. In a case where the initial cooling-water-temperature Two is lower than 0° C., the process proceeds to step S250. Conversely, in a case where the initial cooling-water-temperature Two is equal to or higher than 0° C., the process proceeds to step S245. Here, 0° C. is used as an example of the reference temperature. However, a temperature other than 0° C. (e.g., a temperature that is 10° C. or lower and −5° C. or higher) may be used.

At step S245, an ignition timing is set to a basic ignition timing. The basic ignition timing is set to MBT (Minimum Advance for Best Torque) which is a timing where a torque becomes largest. The ignition timing is expressed by an advance angle with respect to a compression top dead center. MBT basically corresponds to an angle that is slightly advances from the compression top dead center. For example, MBT is calculated by a well-known method based on the rational speeds, which are read at step S230 and step S240, an opening degree of the throttle, and other physical quantities. The process returns to step S215 after step S245.

At step S250, the dual-use controller 200 reads the suction mode, which is sent at step S88 performed by the air-conditioning control section 210. For example, the information about the suction mode is read from an area of the RAM, where information about the suction mode is recorded.

The information about the suction mode is a state information relating to a state of the air conditioner that may have an effect on the outside-air drawing ratio. Specifically, the information about the suction mode is information about an air-conditioner state that may influence the outside-air drawing ratio. Actually, the outside-air drawing ratio is different according to whether the suction mode is the outside-air drawing mode, the inside-air drawing mode, or the inside/outside air drawing mode.

At step S255, it is determined whether the suction mode read in the immediate preceding step, S240, is the inside/outside air drawing mode. In a case where the suction mode is the inside/outside air drawing mode, the process proceeds to step S245. In a case where the suction mode is not the inside/outside air drawing mode, the process proceeds to step S260. In a case where the suction mode is not the inside/outside air drawing mode, the suction mode may be the outside-air drawing mode. For example, when the vehicle compartment is heated in winter, a window may be highly likely to mist. Therefore, when the vehicle compartment is heated in winter, the outside-air drawing mode may be more likely to be selected.

At step S260, it is determined whether the outside-air temperature Tam, which is detected by the outside-air temperature sensor 212, is lower than an outside-reference temperature, e.g., 10° C. A value of the outside-reference temperature is a constant. The process advances to step S265 when the outside-air temperature Tam is lower than the outside-reference temperature, and advances to step S245 when the outside-air temperature Tam is not lower than the outside-reference temperature.

At step S265, it is determined whether the inside-air temperature Tr which is detected by the inside-air temperature sensor 211, is lower than an inside-reference temperature, e.g., 10° C. A value of the inside-reference temperature is a constant. The process advances to step S270 when the inside-air temperature Tr is lower than the inside-reference temperature, and advances to step S245 when the inside-air temperature Tr is not lower than the inside-reference temperature.

An additional amount Qc of heat required to be generated by the engine EG is calculated at step S270. The additional amount Qc is a positive value. The additional amount Qc of heat is required to compensate for an insufficient heating performance performed by the heater core 14 to heat the air. As described later, an amount of heat generated by the engine EG is increased as compared to an amount of heat generated by the engine EG in a normal operation state of the engine EG when a value of the additional amount Qc is positive.

Specifically, the dual-use controller 200 calculates the necessary amount Qc, by using a reference request heat value map, based on the initial cooling-water-temperature Two and the present water temperature Tw detected at steps S210 and S225. A relationship among the initial cooling-water-temperature Two, the present water temperature Tw, and the additional amount Qc of heat is defined in the reference request heat value map in advance. The reference request heat value map is memorized in the ROM of the dual-use controller 200 in advance.

According to the reference request heat value map, the additional amount Qc of heat decreases as the initial cooling-water-temperature Two increases when the present water temperature Tw is fixed. This is because the additional amount Qc of heat, which is generated by the engine EG and necessary to improve heating function, decreases with an increase in the initial cooling-water-temperature Two.

In addition, according to the reference request heat value map, the additional amount Qc of heat decreases as the present water temperature Tw increases when the initial cooling-water-temperature Two is fixed. This is because the additional amount Qc decreases with an increase in the present water temperature Tw. Subsequent to step S270, the process proceeds to step S275.

At step S275, the amount Qd of heat for driving is calculated based on the rotational speed Ne of the engine EG, which is read at step S230, and the opening degree Sw of the throttle, which is read at step S235. A value of the amount Qd is positive. The amount Qd is an amount of heat that is generated by the engine EG when estimating the ignition is performed at MBT being set as the basic ignition timing. The amount Qd is obtained by applying the rotational speed Ne of the engine EG and the opening degree Sw of the throttle to a drive heat value map memorized in the ROM. The map memorizes a relationship among the rotational speed Ne, the opening degree Sw, and the amount Qd of heat.

At step S280, the result of the addition of the additional amount Qc of heat required to be generated by the engine EG calculated in the immediate preceding step, S270, to the amount Qd of heat generated by the engine EG for driving, calculated in the immediate preceding step, S275, is used as the necessary amount Qn of heat to be generated by the engine EG, as shown in FIG. 6.

At step S285, the ignition timing is calculated. The ignition timing calculated at step S285 becomes a timing that is delayed from the basic ignition timing, i.e., from MBT. When delaying the ignition timing from MBT, an operation efficiency deteriorates as a delay angle increases, therefore an amount of heat generated by the engine EG increases. Thus, the dual-use controller 200 increases the delay angle with respect to MBT of the ignition timing as the necessary amount Qn of heat increases. A technique for retarding ignition timing in order to increase the amount of heat generated by an engine is described in, for example, JP 2005-016465 A and JP 2009-167856 A. After step S285, the flow returns to step S215.

As described above, the dual-use controller 200 controls the igniter 274 such that the ignition timing determined at step S245 or S285 in an ignition timing determination process in such a manner is realized in the engine control section 220.

As described above, when the initial cooling-water-temperature Two is equal to or higher than 0° C., the outside-air temperature Tam is lower than the outside-reference temperature, and the inside-air temperature Tr is lower than the inside-reference temperature, the dual-use controller 200 controls operation of the engine EG such that the amount of heat generated by the engine EG in the second ratio is smaller than that in the first ratio in the outside-air drawing ratio. This operation is performed regardless of whether the vehicle is moving or not. Here, the second ratio is lower than the first ratio. The first ratio corresponds to the ratio used in the outside-air drawing mode, and the second ratio corresponds to the ratio used in the inside/outside air drawing mode.

With this configuration, the amount of heat generated by the engine is adjustable according to the outside-air drawing ratio in a vehicle in which the heating is performed by using cooling water of the engine. As a result, the degree of change in the temperature of the engine cooling water can be adjusted according to the outside-air drawing ratio.

There may be concerned that, in winter and in other such periods when the inside-air temperature Tr and the outside-air temperature Tam are low, a window may mist due to the heat of a passenger in the vehicle compartment. In such a case, conventionally, 100% of low-humidity outside air is drawn into an air conditioner. In this case, outside air is heated by a heater core. As a result, the inside of the vehicle compartment is heated. Then, the outside air after heating is discharged from an extractor. In such a conventional technique, the amount of heat taken away from cooling water by the heater core is large. Therefore, increase in engine water temperature is slow. As a result, a heating effect cannot be obtained quickly.

Therefore, when the initial cooling-water-temperature Two, the outside-air temperature Tam, and the inside-air temperature Tr are low, the dual-use controller 200 according to the present embodiment sets the additional amount Qc of heat, which is required to be generated by the engine EG, to zero or larger at step S270. In addition, the dual-use controller 200 determines an ignition timing, which is delayed from MBT (i.e., the basic ignition timing), based on the additional amount Qc of heat at step S285. That is, the dual-use controller 200 executes water-temperature-increase engine control. Thus, the amount of heat generated by the engine EG increases in comparison with the amount of heat generated by usual drive of the engine EG, as described above. Therefore, engine water temperature increases quickly.

However, in a case where the suction mode is the inside/outside air drawing mode even when the initial cooling-water-temperature Two, the inside-air temperature Tr, and the outside-air temperature Tam are low, the dual-use controller 200 does not exert such water-temperature-increase engine control. The reasons are as follows.

In the inside/outside air drawing mode and the foot-defroster mode, outside air to prevent a window from misting and inside air to heat the inside of the vehicle compartment are introduced into the first air passage 112 and the second air passage 113, respectively. Therefore, the heat taken away from the engine cooling water by the heater core 14 is less than that in the outside-air drawing mode. Accordingly, the engine cooling water temperature easily increases quickly. At this time, since heated inside air is circulated without being discharged, temperature in the vehicle compartment increases quickly. At this time, since outside air is blown onto the windshield W, anti-misting performance is less likely to be impaired.

Thus, even when water-temperature-increase engine control is not executed in the inside/outside air drawing mode, increase in engine water temperature does not significantly differ from that when the water-temperature-increase engine control is executed in the outside-air drawing mode, due to the reasons described above.

A comparison is made between a case where the water-temperature-increase engine control is not executed, as described above, when the inside/outside air drawing mode and the foot defrost mode are set and a case where the water-temperature-increase engine control is assumed to be executed when the inside/outside air drawing mode and the foot-defroster mode are set. When the initial water temperature Two is low as in winter, increase in engine cooling water temperature in the former case is slower than that in the latter case. This is because the former case is smaller than the latter case in terms of amount of heat generated by the engine. Therefore, the former is lower than the latter in terms of the present water temperature Tw. However, the former case and the latter case are almost the same in terms of the temperature of air blown into the vehicle compartment from the foot air outlet 19c. Furthermore, when the water-temperature-increase engine control is not executed in the inside/outside air drawing mode, fuel efficiency improves by an amount corresponding to non-execution of the water-temperature-increase engine control.

Second Embodiment

A second embodiment will be described hereafter. An on-vehicle system in the present embodiment is different from the on-vehicle system in the first embodiment in the processing contents of the air-conditioning control section 210 and the engine control section 220.

Figure 7:
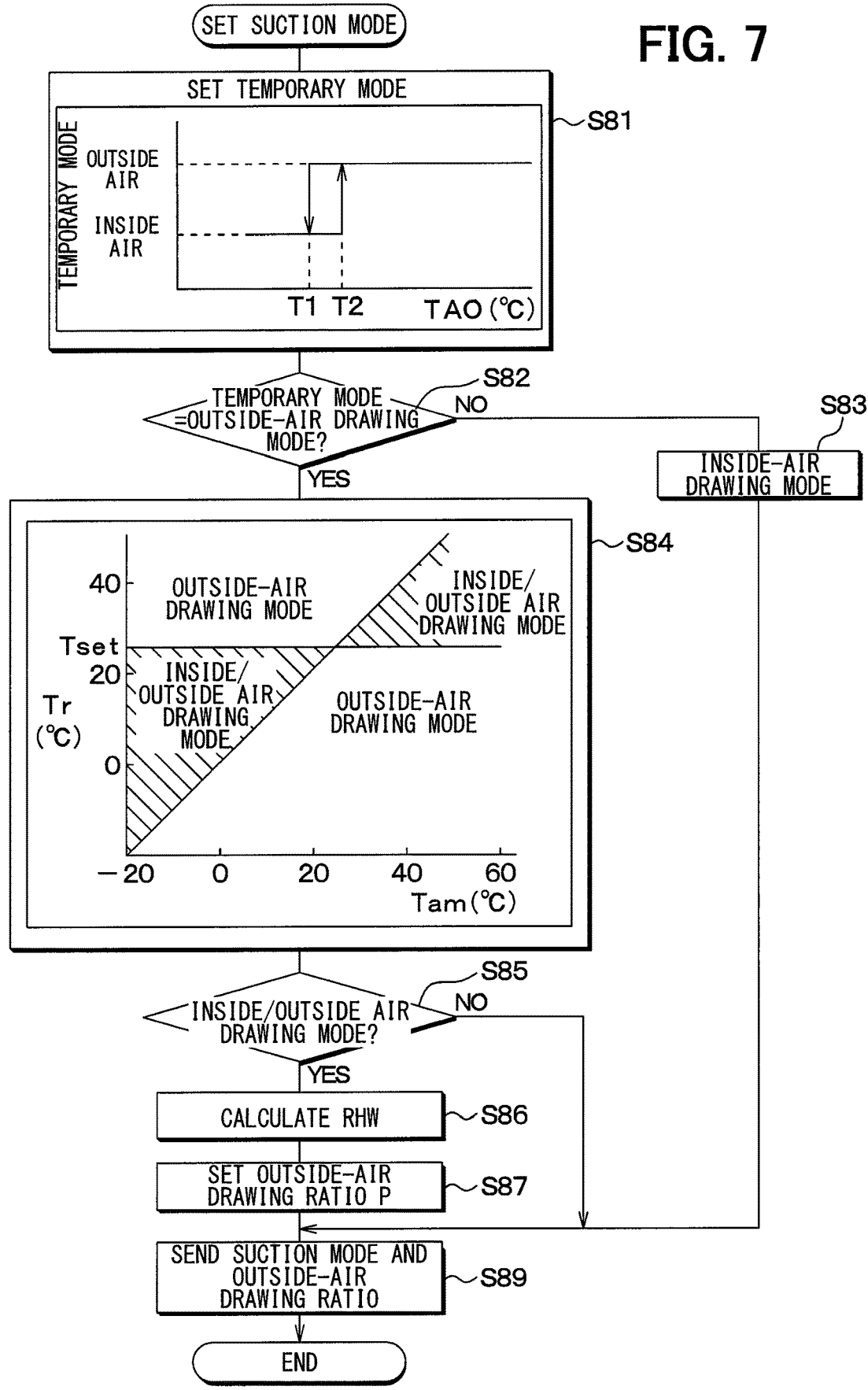
FIG. 7 is a flowchart of a process of determining a suction mode in a second embodiment.

More specifically, in the air-conditioning control section 210, the suction mode determination process in FIG. 4 is replaced by the process shown in FIG. 7. In addition, at step S10 in FIG. 3, a dual-use controller controls an inside/outside switching actuator 221 such that when a suction mode is an inside/outside air drawing mode, an inside/outside air switching door 23 is disposed in the position where an outside-air drawing ratio P, determined in the immediate preceding step, S8, is realized.

Figure 5:
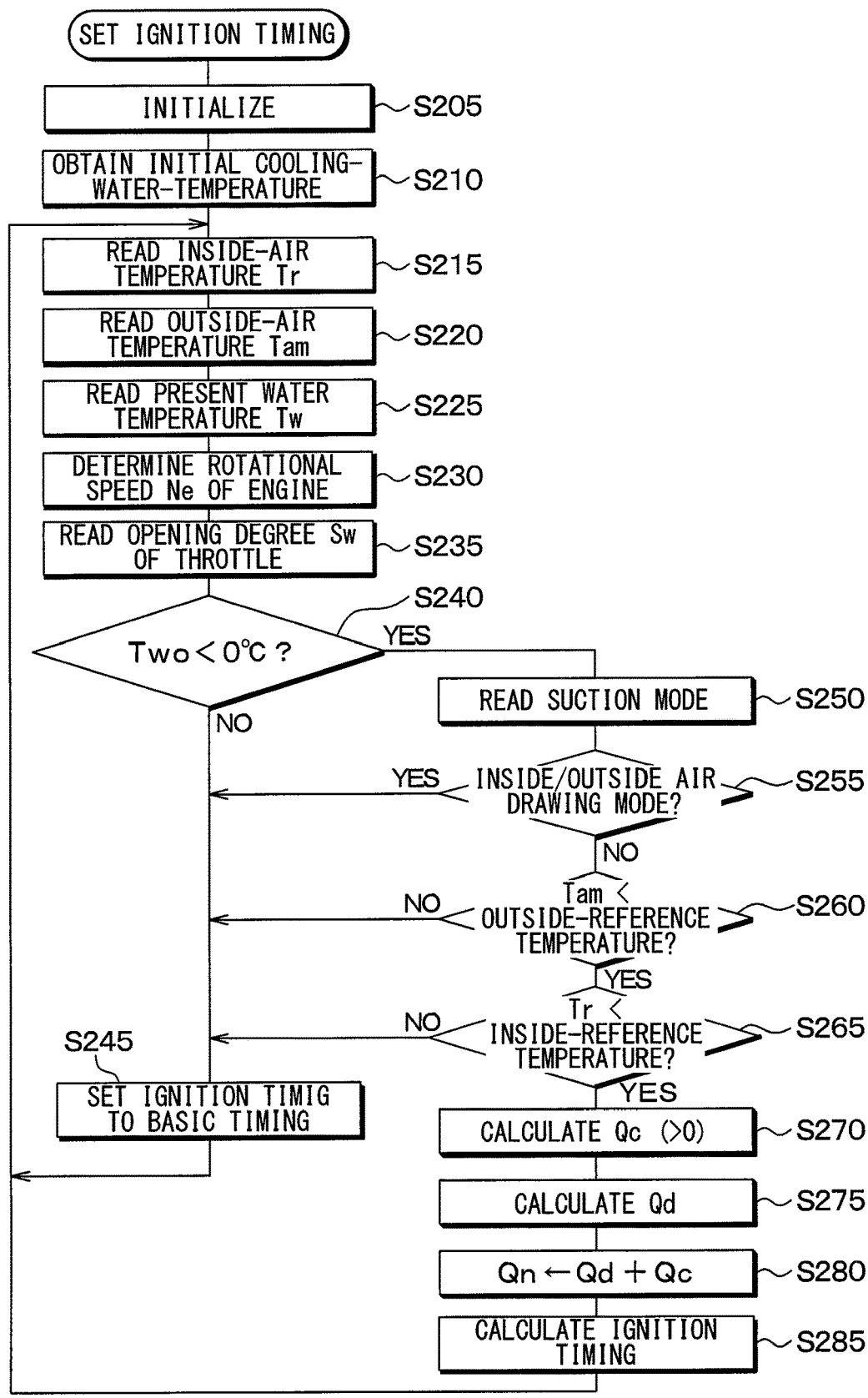
FIG. 5 is a flowchart of an ignition timing determination process.
Figure 8:
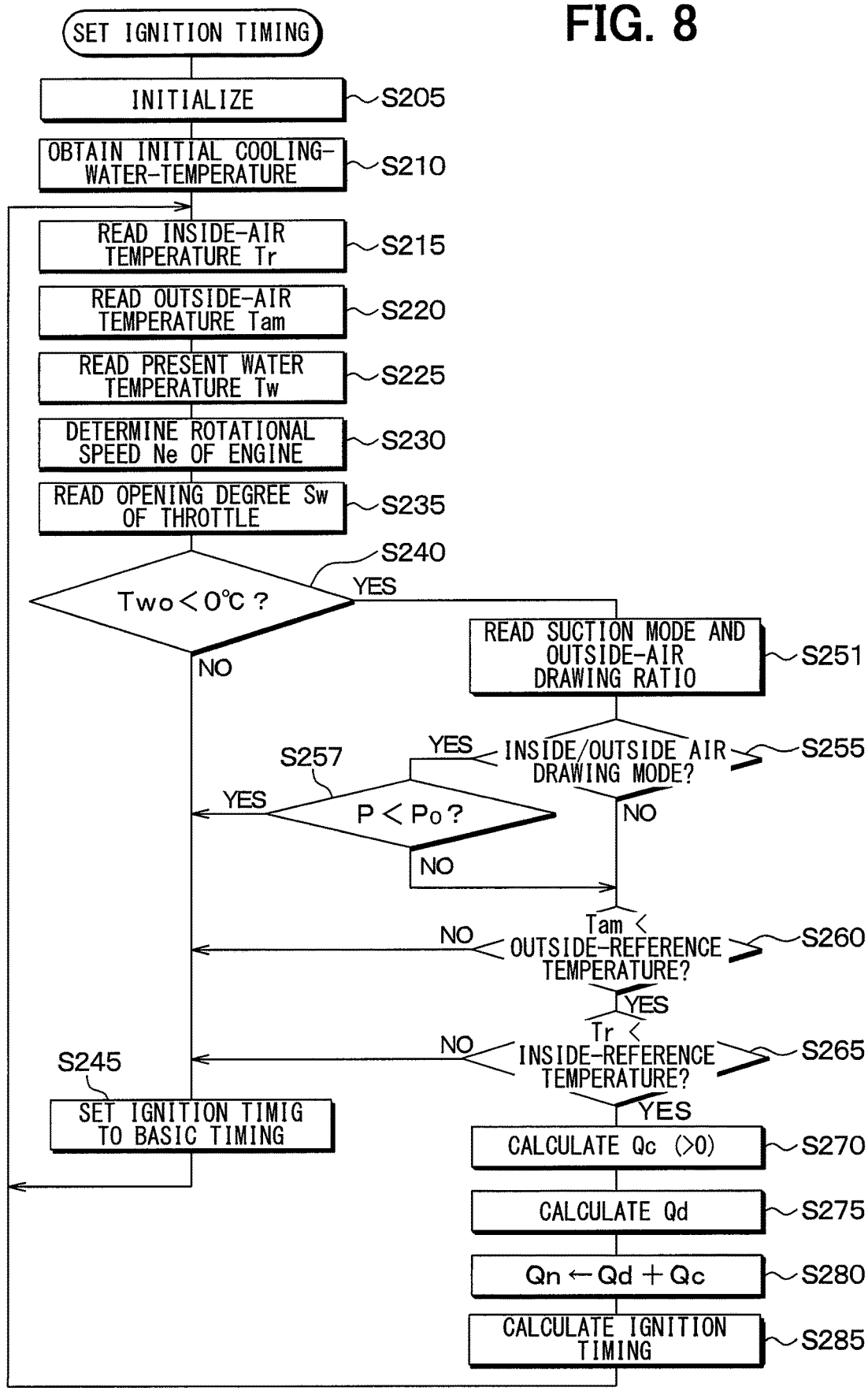
FIG. 8 is a flowchart of an ignition timing determination process.

In the engine control section 220, the ignition timing determination process in FIG. 5 is replaced by the process shown in FIG. 8. Steps in FIG. 4 and steps in FIG. 7 labeled with identical symbols are identical in processing contents. Steps in FIG. 5 and steps in FIG. 8 labeled with identical symbols are identical in processing contents.

First, a suction mode determination process will be described. In the suction mode determination process, a dual-use controller 200 proceeds to step S85 after step S84. At step S85, it is determined whether the suction mode determined in the immediate preceding step, S84, is the inside/outside air drawing mode. In a case where the suction mode is the inside/outside air drawing mode, the process proceeds to step S86. Conversely, in a case where the suction mode is not the inside/outside air drawing mode, that is, the suction mode is an outside-air drawing mode, the process proceeds to step S89.

At step S86, the relative humidity RHW of the inner surface of a windshield W is calculated. The method for calculating the relative humidity RHW has been described in the first embodiment. At step S87, outside-air drawing ratio P in the inside/outside air drawing mode is determined on the basis of the relative humidity RHW calculated in the immediate preceding step, S86. Specifically, the higher the relative humidity RHW is, the higher the outside-air drawing ratio P is set. This is because it is desirable to increase the volume of outside air drawn with an increase in relative humidity RHW in order to prevent a window from misting. As described above, in a case where the relative humidity RHW is equal to or higher than a reference humidity and the inside/outside air drawing mode is set, the blowing mode is a foot-defroster mode. Subsequent to step S87, the process proceeds to step S89.

At step S89, the engine control section 220 is notified of the determined suction mode. In a case where the determined suction mode is the inside/outside air drawing mode, the engine control section 220 is notified of the outside-air drawing ratio P, determined in the immediate preceding step, S87, as well as the determined suction mode. Information about the suction mode and about the outside-air drawing ratio P is information about the state of an air conditioner that may influence the outside-air drawing ratio. The notifying method is identical to that at step S88 in the first embodiment. After step S89, the process proceeds to step S9 in FIG. 5.

An ignition timing determination process will be described hereafter. In the ignition timing determination process, in a case where the dual-use controller 200 determines at step S240 that an initial cooling-water-temperature Two is lower than 0° C., the process proceeds to step S251. At step S251, the present suction mode and, in a case of the inside/outside air drawing mode, the outside-air drawing ratio P, of both of which the air-conditioning control section 210 has been notified at step S89, are read. The method of acquisition is identical to that at step S250 in the first embodiment. Subsequent to step S251, the process proceeds to step S255.

In a case where it is determined at step S255 that the suction mode is the inside/outside air drawing mode, the process proceeds to step S257. At step S257, it is determined whether the outside-air drawing ratio P, which has been read in the immediate preceding step, S251, is lower than a reference ratio P0. In a case where the outside-air drawing ratio P is lower than the reference ratio P0, the process proceeds to step S245. In a case where the outside-air drawing ratio P is not lower than the reference ratio P0, the process proceeds to step S260. The reference ratio P0 is a value higher than 50% but lower than 100%. For example, the reference ratio P0 may be 75%.

By virtue of this, the dual-use controller 200 of the present embodiment proceeds to step S260 in a case where the outside-air drawing ratio P is equal to or higher than the reference ratio even when the suction mode is the inside/outside air drawing mode. In this case, an ignition timing, which is delayed from the basic ignition timing (i.e., MBT), may be calculated at steps S270 to S285 depending on determination results obtained at steps S260, S265. This is because, increasing an amount of heat generated by the engine EG as compared to the normal operation is effective in a case where the outside-air drawing ratio P is sufficiently high even when the inside/outside air drawing mode is performed.

The dual-use controller 200 sets the ignition timing to the basic ignition timing at step S245 as in the first embodiment when the suction mode is the inside/outside air drawing mode and the outside-air drawing ratio P is lower than the reference ratio.

Thus, the dual-use controller 200 changes the amount of heat generated by the engine in accordance with the outside-air drawing ratio P even in the inside/outside air drawing mode. Specifically, the amount of heat generated by the engine is increased with an increase in the outside-air drawing ratio P. Consequently, the higher the outside-air drawing ratio P, the higher the speed at which the temperature of the engine cooling water increases. By virtue of this, the amount of heat generated by the engine can be controlled more flexibly. The other advantageous effects are identical to those in the first embodiment.

Third Embodiment

A third embodiment will be described hereafter. An on-vehicle system in the present embodiment is different from the on-vehicle system in the second embodiment in the processing contents of the engine control section 220.

Figure 9:
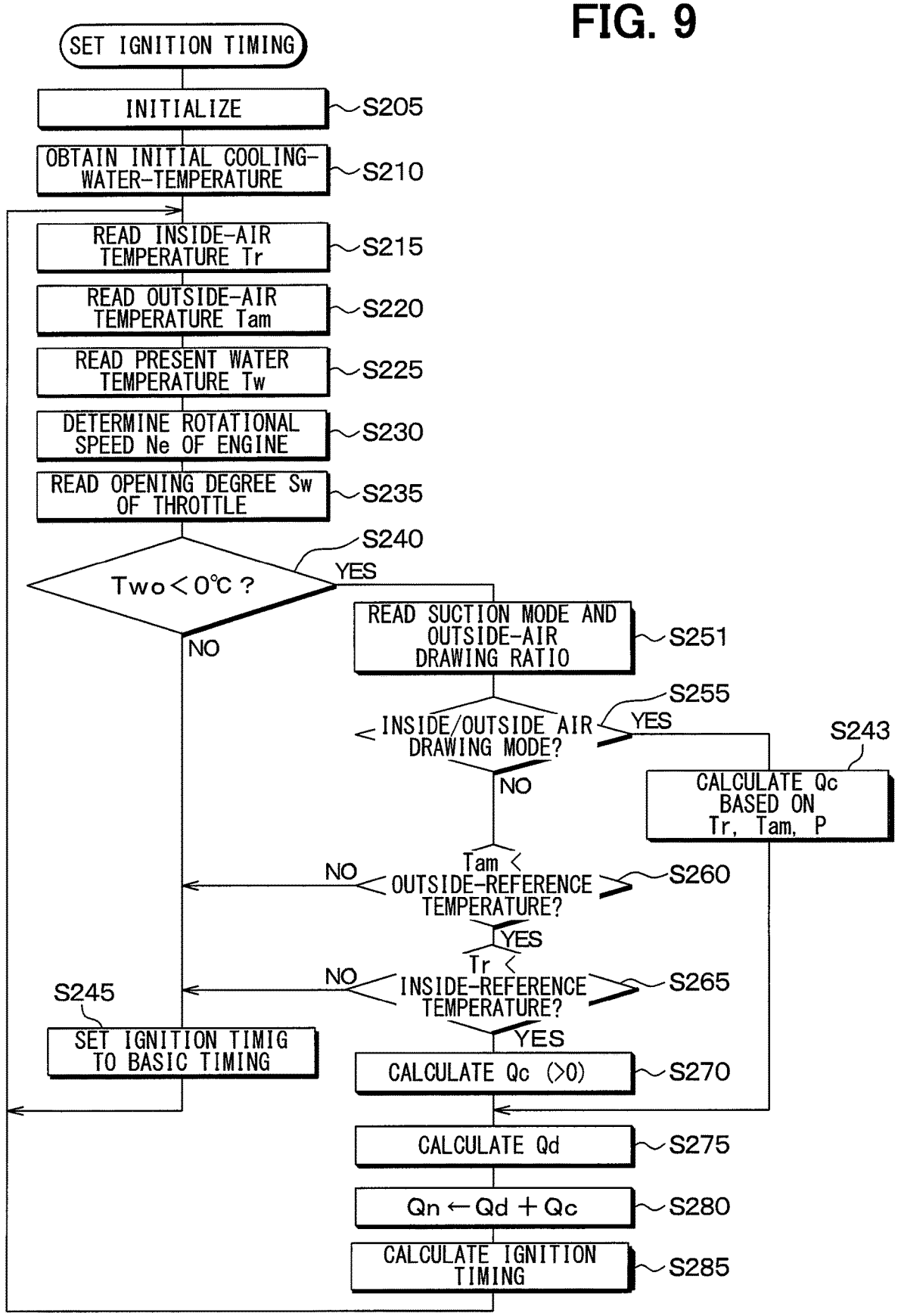
FIG. 9 is a flowchart of an ignition timing determination process in a third embodiment.

More specifically, in the engine control section 220, the ignition timing determination process in FIG. 8 is replaced by the process shown in FIG. 9. Steps in FIG. 8 and steps in FIG. 9 labeled with identical symbols are identical in processing contents.

In an ignition timing determination process, in a case where the dual-use controller 200 determines at step S255 that a suction mode is an inside/outside air drawing mode, the process proceeds to step S243. At step S243, the additional amount Qc of heat required to be generated by the engine EG is calculated. The additional amount Qc of heat required to be generated by the engine EG will have a positive value. However, the calculation method is different from the method at step S270.

Specifically, at step S243, the dual-use controller 200 calculates the additional amount Qc of heat required to be generated by the engine EG, on the basis of various parameters. The various parameters include an initial cooling-water-temperature Two, an inside-air temperature Tr, an outside-air temperature Tam, and the present water temperature Tw detected at steps S210, S215, S220, and S225, respectively. The various parameters also include the outside-air drawing ratio P, read in the immediate preceding step, S251.

Figures 10, 11:
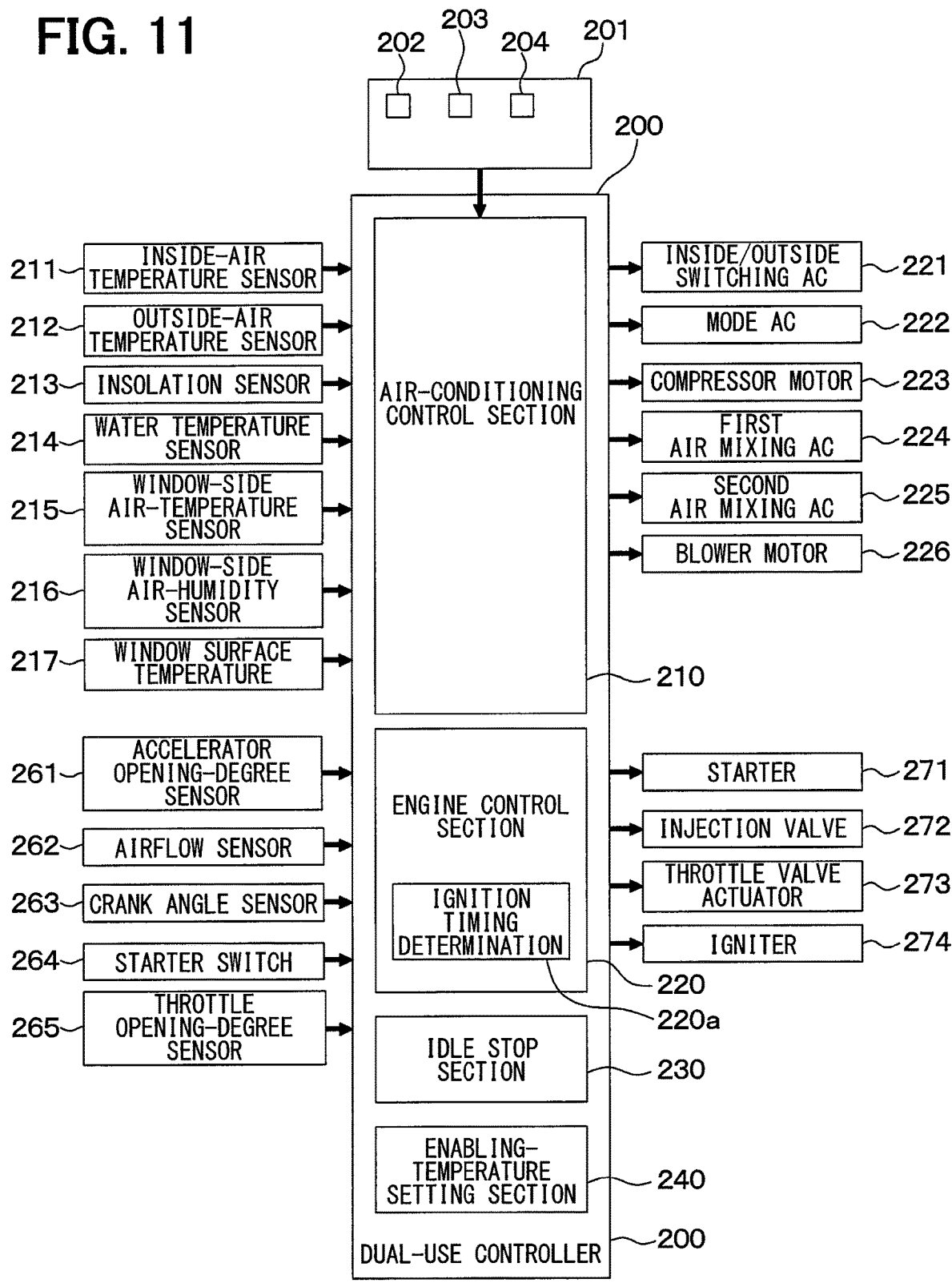
FIG. 10 shows a calculation formula for the additional amount Qc of heat required to be generated by the engine.
FIG. 11 is a view illustrating configurations of a dual-use controller 200 and so on according to a fourth embodiment.

For example, Qc may be calculated using the formula shown in FIG. 10. In the formula, each of H0, H1, H2, H3, H4, and H5 is a constant. H1 is negative. Therefore, the higher the inside-air temperature Tr, the smaller the additional amount Qc of heat required to be generated by the engine EG. This is because the additional amount of heat generated by the engine EG, required to improve heating function, decreases with an increase in inside-air temperature Tr.

H2 is negative. Therefore, the higher the outside-air temperature Tam, the smaller the additional amount Qc of heat required to be generated by the engine EG. This is because the additional amount Qc of heat generated by the engine EG, which is necessary to improve heating function, decreases with an increase in outside-air temperature Tam.

H3 is positive. Therefore, the higher the outside-air drawing ratio P, the larger the additional amount Qc of heat required to be generated by the engine EG. This is because the additional amount of heat generated by the engine EG, which is necessary to improve heating function, increases with an increase in the outside-air drawing ratio P.

H4 is negative. Therefore, the higher the present water temperature Tw, the smaller the additional amount Qc of heat required to be generated by the engine EG. H5 is negative. Therefore, the higher the initial cooling-water-temperature Two, the smaller the additional amount Qc of heat required to be generated by the engine EG.

It is noted that the constants H0, H1, H2, H3, H4, and H5 are determined such that the additional amount Qc of heat required to be generated by the engine EG is positive when the inside-air temperature Tr, the outside-air temperature Tam, the outside-air drawing ratio P, the initial water temperature Two, and the present water temperature Tw lie in respective usual ranges.

When comparing the additional amount Qc of heat calculated at step S270 with the additional amount Qc of heat calculated at step S243, the additional amount Qc calculated at step S270 is greater than the additional amount Qc calculated at step S243 in a case where the present water temperature Tw and the initial cooling-water temperature Two are fixed. This is because the additional amount Qc calculated at step S270 corresponds to the additional amount Qc in the outside-air drawing mode in which the outside-air drawing ratio is 100%. The process proceeds to step S275 after step S243.

Thus, the dual-use controller 200 linearly changes the amount of heat generated by the engine with respect to the outside-air drawing ratio P, the inside-air temperature Tr, and the outside-air temperature Tam in the inside/outside air drawing mode. By virtue of this, the amount of heat generated by the engine can be controlled more flexibly. The other advantageous effects are identical to those in the second embodiment.

Fourth Embodiment

A fourth embodiment will be described hereafter. An on-vehicle system in the present embodiment is different from the on-vehicle systems in the first, second, and third embodiments in the processing contents of the dual-use controller 200. Specifically, as shown in FIG. 11, the dual-use controller 200 performs an idle stop section 230 and an enabling-temperature setting section 240, in addition to an air-conditioning control section 210 and the engine control section 220. The dual-use controller 200 simultaneously operates these sections 210, 220, 230, 240 in parallel by multi-task processing.

First, the idle stop section 230 will be described. The dual-use controller 200 performs the idle stop section 230 during heating of the vehicle compartment. Whether the vehicle compartment is being heated is determined according to the positions of the first air mix door 17 and the second air mix door 18. Specifically, when air is allowed to pass through the heater core 14, the vehicle compartment is being heated.

In the idle stop section 230, the dual-use controller 200 controls actuators 272, 273, 274 such that the engine EG stops on the basis that, during the operation of the engine EG, the present water temperature Tw detected by a water temperature sensor 214 is equal to or higher than an enabling temperature and a predetermined idling stop requirement is established. Thus, the vehicle enters an idling stop state. The idling stop requirement is, for example, a requirement that the vehicle be stationary and a brake pedal have been depressed for a predetermined time or longer.

In the idle stop section 230, the dual-use controller 200 does not stop the engine EG even when the idling stop requirement described above is established in a case where the present water temperature Tw detected by a water temperature sensor 214 is lower than a enabling temperature during operation of the engine EG. Thus, the vehicle does not enter an idling stop state.

In the idle stop section 230, the dual-use controller 200 actuates a starter 271 on the basis that the idling stop requirement described above has not been satisfied in the idling stop state. Thus, the engine EG starts. The vehicle cancels the idling stop state.

In the idle stop section 230, the dual-use controller 200 actuates the starter 271 on the basis that the present water temperature Tw detected by the water temperature sensor 214 has decreased below the enabling temperate even when the idling stop requirement has been satisfied in the idling stop state. Thus, the engine EG starts. The vehicle cancels the idling stop state.

Thus, the idle stop section 230 prohibits the idle stop, i.e., prohibits the engine EG from being operated, when the present water temperature Tw is lower than a set water temperature even when the idling stop requirement is satisfied. In addition, the idle stop section 230 enables the idle stop, i.e., enables the engine EG to be operated, when the present water temperature Tw is higher than the set water temperature. That is, when the present water temperature Tw is higher than the set water temperature, the idle stop section 230 enables the idle stop when the idling stop requirement is satisfied.

This is because the idling stop state brought about when the present water temperature Tw is low blocks increase in the engine cooling water temperature. If the engine cooling water temperature does not increase, heating comfort is impaired.

An enabling-temperature setting section 240 will be described hereafter. In the enabling-temperature setting section 240, the value of a enabling temperature used in the idle stop section 230 is set. In the enabling-temperature setting section 240, as shown in FIG. 12, the dual-use controller 200 first reads, at step S305, the present suction mode of which the air-conditioning control section 210 has been informed of at step S88 or S89. The method of acquisition is identical to that at steps S250 and S251.

At step S310, it is determined whether the suction mode read in the immediate preceding step, S305, is an inside/outside air drawing mode. In a case where the suction mode is the inside/outside air drawing mode, the process proceeds to step S330. In a case where the suction mode is not the inside/outside air drawing mode, the process proceeds to step S320. In a case where the suction mode is not the inside/outside air drawing mode, the suction mode may be the outside-air drawing mode. For example, when the vehicle compartment is heated in winter, a window may be highly likely to mist. Therefore, when the vehicle compartment is heated in winter, the outside-air drawing mode may be more likely to be selected.

At step S320, the enabling temperature is set to a predetermined value A. After step S320, the flow returns to step S305. In the step S330, the enabling temperature is set to a predetermined value B. After step S330, the flow returns to step S305.

In this manner, the dual-use controller 200 repeatedly updates the enabling temperature in the enabling-temperature setting section 240. The value B is smaller than the value A. Accordingly, idling stop state occurs more often in the inside/outside air drawing mode than in the outside-air drawing mode.

For example, the difference between the inside/outside air drawing mode and in the outside-air drawing mode is clear when the engine cooling water temperature is higher than the value B but lower than the value A. Specifically, in some cases in such a situation, the idling stop state may not be brought about in the outside-air drawing mode, but may be brought about in the inside/outside air drawing mode. That is, the dual-use controller 200 switches between turning on and turning off of the engine based on whether the suction mode is the inside/outside air drawing mode or the outside-air drawing mode.

This is because the inside/outside air drawing mode is lower than the outside-air drawing mode in terms of the outside-air drawing ratio. In a case where an outside-air drawing ratio is low, decrease in heating effect is less even when the engine cooling water temperature is low. This is because heated inside air is circulated without being discharged.

By virtue of such a reason, the enabling temperature can be set low in the inside/outside air drawing mode. This makes it possible to quickly increase the engine cooling water temperature to the enabling temperature, for example, after starting the engine in winter. By so doing, fuel efficiency is improved.

As described above, the dual-use controller 200 sets the enabling temperature lower when the outside-air drawing ratio is the second ratio (i.e., the outside-air drawing ratio in the inside/outside air drawing mode) than when the outside-air drawing ratio is the first ratio (i.e., the outside-air drawing ratio in the outside-air drawing mode), the second ratio being lower than the first ratio.

Idling stop is a known technique and is disclosed in JP 2014-227854 A, for example. The temperature of the cooling water does not rise when the idle stop is performed while the temperature of the cooling water is low, therefore comfort in the heating operation deteriorates. According to studies by the inventors, it is considered to switch between enabling the idle stop and prohibiting the idle stop depending on the temperature of the cooling water to secure the comfort in the heating operation. However, the enabling temperature, which is a threshold value to determine whether to enable the idle stop, varies depending on states of the air conditioner. Therefore, the enabling temperature may be required to be adjusted depending on the states of the air conditioner.

As described above, the enabling temperature can be set lower in the second ratio of the outside-air drawing ratio than in the first ratio of the outside-air drawing ratio, the second ratio being lower than the first ratio.

This is because, in the case where an outside-air drawing ratio is low, decrease in heating effect is less even when the engine cooling water temperature is low. This makes it possible to quickly increase the temperature of the cooling water to the enabling temperature, for example, after starting the engine EG in winter. By so doing, fuel efficiency is improved.

Fifth Embodiment

A fifth embodiment will be described hereafter. An on-vehicle system in the present embodiment is different in the enabling-temperature setting section 240 from the embodiment in which a change to the fourth embodiment is applied in the third embodiment. Specifically, as the enabling-temperature setting section 240 in the present embodiment, the process shown in FIG. 13 is employed instead of the process in the fourth embodiment in FIG. 12. In FIGS. 12 and 13, steps identical in processing content are labeled with identical step numbers.

The enabling-temperature setting section 240 in the present embodiment will be described hereafter. The dual-use controller 200, after being started by turning on the ignition switch, starts operating the enabling-temperature setting section 240. At step S300, the enabling-temperature setting section 240 initializes a variable. The dual-use controller 200 then waits for the engine EG to start. When the engine EG starts, the dual-use controller 200 obtains the initial cooling-water-temperature Two based on a detection result of the water temperature sensor 214 at step S302.

At step S306, the present suction mode and, in a case of an inside/outside air drawing mode, the outside-air drawing ratio P, of both of which the air-conditioning control section 210 have been notified at step S89, are read. The method of acquisition is identical to that at step S251 in the second embodiment.

At step S310, it is determined whether the suction mode read in the immediate preceding step, S306, is an inside/outside air drawing mode. In a case where the suction mode is the inside/outside air drawing mode, the process proceeds to step S322. In a case where the suction mode is not the inside/outside air drawing mode, the process proceeds to step S320. In a case where the suction mode is not the inside/outside air drawing mode, the suction mode may be the outside-air drawing mode. For example, when the vehicle compartment is heated in winter, a window may be highly likely to mist. Therefore, when the vehicle compartment is heated in winter, the outside-air drawing mode may be more likely to be selected.

At step S320, the enabling temperature is set to a predetermined value A. After step S320, the flow returns to step S306.

At step S322, an inside-air temperature Tr detected by the inside-air temperature sensor 211 and an outside-air temperature Tam detected by an outside-air temperature 212 are read. At step S325, a value B is calculated. At step S330, the enabling temperature is set to the value B calculated in the immediate preceding step, S325. After step S330, the flow returns to step S306.

In this manner, the dual-use controller 200 repeatedly updates the enabling temperature in the enabling-temperature setting section 240. A method for calculating the value B in S325 will be described with reference to FIG. 14.

Specifically, at step S325, the dual-use controller 200 calculates the value B on the basis of various parameters. The various parameters include the initial cooling-water-temperature Two, and the inside-air temperature Tr and outside-air temperature Tam, read in the immediate preceding steps, S302 and S322 respectively. Various parameters also include the outside-air drawing ratio P, read in the immediate preceding step, S306.

For example, the value B may be calculated using the formula shown in FIG. 14. In the formula, each of J0, J1, J2, J3, and J4 is a constant. J1 is negative, therefore, the higher the inside-air temperature is, the lower the enabling temperature is. J2 is negative, therefore, the higher the outside-air temperature Tam is, the lower the enabling temperature is. This is because the cooling water temperature required for heating comfort decreases with an increase in the outside-air temperature Tam.

J3 is positive, therefore, the higher the outside-air drawing ratio P is, the higher the enabling temperature is. This is because the cooling water temperature required for heating comfort increases with an increase in the outside-air drawing ratio P. J4 is negative, therefore, the higher the initial cooling-water-temperature Two is, the lower the enabling temperature is.

Each of the variables J0, J1, J2, J3, and J4 is set such that the value B calculated at step S325 is always smaller than the value A within the normally possible ranges of the variables Tr, Tam, P, and Two.

Thus, the dual-use controller 200 linearly changes the enabling temperature with respect to the outside-air drawing ratio P, the inside-air temperature Tr, and the outside-air temperature Tam in the inside/outside air drawing mode. That is, the dual-use controller 200 switches between turning on and turning off of the engine in the inside/outside air drawing mode based on the outside-air drawing ratio P, the inside-air temperature Tr, and the outside-air temperature Tam. By virtue of this, the amount of heat generated by the engine can be controlled more flexibly. The other advantageous effects are identical to those in the fourth embodiment.

As described above, in the inside/outside air drawing mode also, the dual-use controller 200 sets the enabling temperature lower when the outside-air drawing ratio is the second ratio than when the outside-air drawing ratio is the first ratio, the second ratio being lower than the first ratio.

Supplementary Explanation for the Above-Described Embodiments In each embodiment described above, the dual-use controller 200 executes steps S250, S251, S305, and S306 and, therefore, corresponds to the reading section. The dual-use controller 200 executes steps S240 to S285, the idle stop section 230, and the enabling-temperature setting section 240 and, therefore, corresponds to a ratio-setting control section. The dual-use controller 200 executes the idle stop section 230 and, therefore, corresponds to an idle stop section. The dual-use controller 200 executes the enabling-temperature setting section 240 and, therefore, corresponds to a enabling-temperature setting section. The dual-use controller 200 executes S81 to S87 and, therefore corresponds to a state setting section. The dual-use controller 200 executes S88 and S89 and, therefore corresponds to a information sending section. The dual-use controller 200 executes the engine control section 220, the idle stop section 230, and the enabling-temperature setting section 240 and, therefore, corresponds to an engine control section. In addition, all of RAM, ROM, and flash memory in each embodiment are non-transitional, tangible recording media.

Modifications

The present disclosure is not limited to the above-described embodiments and can be modified within the scope of the present disclosure. The above-described embodiments are not unrelated to each other and can be combined with each other except for a case where the combination is clearly improper. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. When two or more values are especially represented, a value between a largest value and a smallest value of the two or more values may be used, except for a case of being explicitly specified to be necessary and a case of being considered to be absolutely inappropriate in principle. Even when a feature such as a material forming a member, a shape of a member, or a positional relation of members, it is to be understood that such feature is not limited to a specific material, shape, positional relation, or the like except for a case of being explicitly specified to be necessary and a case of being considered to be absolutely necessary in principle. The present disclosure may include the following modifications. Each of the following modifications can be employed as required. That is, any arbitrary combination of the following modifications can be applied for the above-described embodiments.

MODIFICATION EXAMPLE 1

The basic ignition timing is not limited to MBT. The basic ignition timing is set as required as long as being an ignition timing where the outside-air drawing ratio is sufficiently low.

MODIFICATION EXAMPLE 2

In each embodiment, information about the suction mode and information about the outside-air drawing ratio are given as examples of the state information. However, any information suffices as long as the state information is information relating to an air conditioner state that may have an effect on the outside-air drawing ratio. For example, the additional amount Qc of heat required to be generated by the engine EG may be the state information or the necessary amount Qn of heat to be generated by the engine EG may be the state information.

MODIFICATION EXAMPLE 3

In each embodiment described above, the dual-use controller 200 operates all of the air-conditioning control section 210, the engine control section 220, the idle stop section 230, and the enabling-temperature setting section 240. However, devices that operate the air-conditioning control section 210, the engine control section 220, the idle stop section 230, and the enabling-temperature setting section 240 may be provided separately.

MODIFICATION EXAMPLE 4

In each embodiment described above, the air-conditioner housing 11 is structured such that the inside/outside air drawing mode can be realized. However, the air-conditioner housing 11 may be a single-layer casing that cannot realize the inside/outside air drawing mode. In this case, the dual-use controller 200 sets the value of the additional amount Qc of heat required to be generated by the engine EG according to the outside-air drawing ratio such that the value of the additional amount Qc increases with an increase in the outside-air drawing ratio. In this case, a single outside-air drawing ratio corresponds to state information. The outside-air drawing ratio in an outside-air drawing mode corresponds to a first ratio, and the outside-air drawing ratio lower than the first ratio corresponds to a second ratio.

MODIFICATION EXAMPLE 5

According to the above-described embodiments, an amount of heat generated by the engine EG is increased by delaying an ignition timing as compared to the basic ignition timing. However, a method for increasing the amount of heat generated by the engine EG is not limited to the above-described method. For example, when the vehicle is idling, the amount of heat generated by the engine EG may be increased as compared to an amount of heat when the engine EG is in the normal operation state in a manner that the rotational speed Ne of the engine EG is increased by increasing the opening degree of the throttle as compared to an opening degree of the throttle when the engine EG is in the normal operation state.

What is claimed is:

1. An engine controller that controls an operation of an engine, the engine generating power for moving a vehicle, the engine controller comprising:
    a reading section that is included in an air conditioner, the air conditioner drawing an air into an air-conditioner housing, heating the air by using a cooling water cooling the engine, and blowing the air into a vehicle compartment of the vehicle, the reading section reading a state information that relates to a state of the air conditioner having an effect on an outside-air drawing ratio, the outside-air drawing ratio being a ratio of a volume of an outside air, which is drawn into the air-conditioner housing from an outside of the vehicle compartment, to a total volume of the outside air and an inside air, which is drawn into the air-conditioner housing from an inside of the vehicle compartment; and
    a ratio-setting control section that controls an operation of the engine based on the state information read by the reading section, thereby decreasing an amount of heat generated by the engine when the outside-air drawing ratio is a second ratio, which is smaller than a first ratio, to be smaller than an amount of heat generated by the engine when the outside-air drawing ratio is the first ratio.

2. The engine controller according to claim 1, wherein the ratio-setting control section includes
    an idle stop section that enables the engine to perform an idling stop when a temperature of the cooling water is higher than an enabling temperature and
    an enabling-temperature setting section that lowers the enabling temperature when the outside-air drawing ratio is the second ratio as compared to that when the outside-air drawing ratio is the first ratio, based on the state information read by the reading section.

3. The engine controller according to claim 1, wherein the air conditioner is configured to set an inside/outside air drawing mode as a suction mode, the inside/outside air drawing mode in which an outside air is introduced from an outside of the vehicle compartment into a first air passage and blown into the vehicle compartment and an inside air is introduced from an inside of the vehicle compartment into a second air passage and blown into the vehicle compartment,
    the state information includes information about whether the suction mode is set to the inside/outside air drawing mode,
    the ratio-setting control section controls the engine based on the state information read by the reading section, thereby lowering an amount of heat, which is generated by the engine when the suction mode is the inside/outside air drawing mode, as compared to an amount of heat, which is generated by the engine when the suction mode is a mode other than the inside/outside air drawing mode.

4. The engine controller according to claim 3, wherein
the state information includes (i) information about whether the suction mode is the inside/outside air drawing mode and (ii) a value of the outside-air drawing ratio when the suction mode is the inside/outside air drawing mode, and when the suction mode is the inside/outside air drawing mode, the ratio-setting control section controls the engine based on the state information read by the reading section, thereby increasing an amount of heat, which is generated by the engine, as the outside-air drawing ratio increases.

5. The engine controller according to claim 1, wherein
the ratio-setting control section switches between turning on the engine and turning off the engine based on the state information read by the reading section.

6. The engine controller according to claim 1, wherein
the ratio-setting control section controls the engine, thereby reducing an amount of heat, which is generated by the engine, as a temperature inside the vehicle compartment rises.

7. The engine controller according to claim 1, wherein
the ratio-setting control section controls the engine, thereby reducing an amount of heat, which is generated by the engine, as a temperature outside the vehicle compartment rises.

8. The engine controller according to claim 1, wherein
the ratio-setting control section controls the engine, thereby reducing an amount of heat, which is generated by the engine, as a temperature of the cooling water rises.

9. An air-conditioning system that adjusts a temperature in a vehicle compartment of a vehicle, the air-conditioning system comprising:

an air conditioner that is mounted to the vehicle and has an air-conditioning housing, the air conditioner drawing air into the air-conditioning housing and blowing the air into the vehicle compartment after heating the air by using a cooling water cooling the engine; and an air-conditioning controller that controls an operation of the air conditioner, wherein the vehicle mounts an engine and an engine controller, the engine generating power and moving the vehicle, the engine controller controlling the engine, and the air-conditioning controller includes a state setting section that sets a state of the air conditioner having an effect on an outside-air drawing ratio, the outside-air drawing ratio being a ratio of a volume of an outside air, which is drawn into the air-conditioner housing from an outside of the vehicle compartment, to a total volume of the outside air and an inside air, which is drawn into the air-conditioner housing from an inside of the vehicle compartment, and an information sending section that sends a state information relating to the state, which is set by the state setting section, to the engine controller, thereby decreasing an amount of heat, which is generated by the engine when the outside-air drawing ratio is a second ratio smaller than a first ratio, to be smaller than an amount of heat, which is generated by the engine when the outside-air drawing ratio is the first ratio.

10. A program for an air-conditioning controller that controls an air conditioner including an air-conditioning housing, the air conditioner being mounted to a vehicle that mounts an engine generating power and moving the vehicle and an engine controller controlling the engine, the air conditioner drawing air into the air-conditioning housing and blowing the air into a vehicle compartment of the vehicle after heating the air by using a cooling water cooling the engine, wherein the program operates the air-conditioning controller to perform as a state setting section that sets a state of the air conditioner having an effect on an outside-air drawing ratio, the outside-air drawing ratio being a ratio of a volume of an outside air, which is drawn into the air-conditioner housing from an outside of the vehicle compartment, to a total volume of the outside air and an inside air, which is drawn into the air-conditioner housing from an inside of the vehicle compartment and an information sending section that sends a state information relating to the state, which is set by the state setting section, to the engine controller, thereby decreasing an amount of heat, which is generated by the engine when the outside-air drawing ratio is a second ratio smaller than a first ratio, to be smaller than an amount of heat, which is generated by the engine when the outside-air drawing ratio is the first ratio.

\* \* \* \* \*